US010509533B2

(12) United States Patent
Grasset et al.

(10) Patent No.: US 10,509,533 B2
(45) Date of Patent: Dec. 17, 2019

(54) SYSTEMS AND METHODS OF GENERATING AUGMENTED REALITY (AR) OBJECTS

(71) Applicant: QUALCOMM Incorporated, San Diego, CA (US)

(72) Inventors: Raphael Grasset, Vienna (AT); Hartmut Seichter, Erfurt (DE)

(73) Assignee: QUALCOMM Incorporated, San Diego, CA (US)

(*) Notice: Subject to any disclaimer, the term of this patent is extended or adjusted under 35 U.S.C. 154(b) by 432 days.

(21) Appl. No.: 14/275,523

(22) Filed: May 12, 2014

(65) Prior Publication Data
US 2014/0344762 A1 Nov. 20, 2014

Related U.S. Application Data

(60) Provisional application No. 61/823,295, filed on May 14, 2013.

(51) Int. Cl.
G06F 3/0481 (2013.01)
G06F 3/0488 (2013.01)

(52) U.S. Cl.
CPC ...... G06F 3/04815 (2013.01); G06F 3/04883 (2013.01)

(58) Field of Classification Search
CPC ......... G06T 19/006; G06T 3/40; G06T 13/40; G06T 7/0044; G06T 7/0063;
(Continued)

(56) References Cited

U.S. PATENT DOCUMENTS 6,367,698 B1 * 4/2002 Yamamoto ......... G06K 7/10851
235/462.11
7,050,625 B2 * 5/2006 Bean ...................... H04N 5/262
348/E5.051
(Continued)

FOREIGN PATENT DOCUMENTS

CN 101243392 A 8/2008
CN 101288077 A 10/2008
(Continued)

OTHER PUBLICATIONS

NPL: An Intelligent System for the Defect Inspection of Specular Painted Ceramic Tiles by Jinhua Li, 2006.*
(Continued)

Primary Examiner — Devona E Faulk
Assistant Examiner — Ming Wu
(74) Attorney, Agent, or Firm — Polsinelli LLP

(57) ABSTRACT

Methods, systems, computer-readable media, and apparatuses for generating an Augmented Reality (AR) object are presented. The method may include capturing an image of one or more target objects, wherein the one or more target objects are positioned on a pre-defined background. The method may also include segmenting the image into one or more areas corresponding to the one or more target objects and one or more areas corresponding to the pre-defined background. The method may additionally include converting the one or more areas corresponding to the one or more target objects to a digital image. The method may further include generating one or more AR objects corresponding to the one or more target objects, based at least in part on the digital image.

25 Claims, 18 Drawing Sheets

(58) Field of Classification Search
CPC . G06F 3/04226; G06F 3/0346; H04N 5/2621;
G06D 7/10851
See application file for complete search history.

(56) References Cited

U.S. PATENT DOCUMENTS

| | | | |
|---|---|---|---|
| 7,746,345 B2* | 6/2010 | Hunter | G06T 13/40 345/419 |
| 7,852,317 B2* | 12/2010 | Grunnet-Jepsen | G06F 3/0346 345/158 |
| 7,876,317 B2* | 1/2011 | Zhang | G06T 7/0063 345/419 |
| 8,315,432 B2 | 11/2012 | Lefevre et al. | |
| 8,396,296 B2* | 3/2013 | Hu | G06K 9/00 345/522 |
| 8,417,058 B2* | 4/2013 | Tardif | G06T 11/00 382/282 |
| 2006/0002607 A1* | 1/2006 | Boncyk | G06F 17/30247 382/165 |
| 2009/0141023 A1* | 6/2009 | Shuster | G06T 3/40 345/419 |
| 2009/0185759 A1* | 7/2009 | Liu | G06T 15/205 382/284 |
| 2010/0002909 A1 | 1/2010 | Lefevre et al. | |
| 2011/0310087 A1* | 12/2011 | Wright, Jr. | G06T 13/80 345/419 |
| 2012/0069051 A1 | 3/2012 | Hagbi et al. | |
| 2012/0146998 A1 | 6/2012 | Kim et al. | |
| 2012/0188342 A1 | 7/2012 | Gervautz et al. | |
| 2012/0195460 A1 | 8/2012 | Lawrence | |
| 2012/0206363 A1* | 8/2012 | Kyprianou | G06F 3/04883 345/168 |
| 2012/0257795 A1* | 10/2012 | Kim | H04N 13/373 382/106 |
| 2012/0290401 A1* | 11/2012 | Neven | A61B 3/113 705/14.68 |
| 2012/0294539 A1* | 11/2012 | Lim | G06K 9/00664 382/218 |
| 2013/0063487 A1 | 3/2013 | Spiegel et al. | |
| 2013/0136300 A1* | 5/2013 | Wagner | G06T 7/0044 382/103 |
| 2013/0307875 A1* | 11/2013 | Anderson | G06T 19/006 345/633 |
| 2015/0243084 A1* | 8/2015 | Kanemaru | G06T 19/006 345/426 |

FOREIGN PATENT DOCUMENTS

| | | |
|---|---|---|
| CN | 102413267 A | 4/2012 |
| CN | 102473324 A | 5/2012 |
| CN | 102592301 A | 7/2012 |
| CN | 102929391 A | 2/2013 |
| JP | H05344314 A | 12/1993 |
| JP | 2004145448 A | 5/2004 |
| JP | 2005063225 A | 3/2005 |
| JP | 2005293259 A | 10/2005 |
| JP | 2010049323 A | 3/2010 |
| JP | 2010246845 A | 11/2010 |
| JP | 2011221980 A | 11/2011 |
| JP | 2012014680 A | 1/2012 |
| WO | 2013061504 A1 | 5/2013 |

OTHER PUBLICATIONS

Valentin Heun, Smarter Objects: Using AR technology to Program Physical Objects and their Interactions, Apr. 27, 2013.*
Stephen Burns, 2D to 3D in Photoshop CS6 Extended—layers magazine, Jun. 8, 2012.*
An Intelligent System for the Defect Inspection of Specular Painted Ceramic Tiles, 2006 (Year: 2006).*
Smarter Objects: Using AR technology to Program Physical Objects and their Interactions, Apr. 27, 2013 (Year: 2013).*
Stephen Burns, 2D to 3D in Photoshop CS6 Extended—layers magazine, Jun. 8, 2012 (Year: 2012).*
Bergig O., et al., "In-Place 3D Sketching for Authoring and Augmenting Mechanical Systems," 8th IEEE International Symposium on Mixed and Augmented Reality (ISMAR 2009), 2009, pp. 87-94.
Camera Zoom FX—Android Apps on Google Play, Camera Zoom FX, Androidslide—Aug. 22, 2013, [Retrieved dated on Aug. 22, 2013], Retrieved from the Internet < URL: https://play.google.com/store/apps/details?id=slide.cameraZoom&hl=en >, 3 Pages.
Clark A., et al., "An Interactive Augmented Reality Coloring Book," SIGGRAPH Asia, 2011, p. 1.
Cornea N.D., et al., "Curve-Skeleton Properties, Applications, and Algorithms," IEEE Transactions on Visualization and Computer Graphics, May/Jun. 2007, pp. 530-548, vol. 13 (3).
De Lima E.S., et al., "Draw Your Own Story: Paper and Pencil Interactive Storytelling," Entertainment Computing—ICEC 2011, Lecture Notes in Computer Science, 2011, pp. 1-12, vol. 6972.
Dos Santos G.J.D., et al., "Paper-based Mixed Reality Sketch Augmentation as a Conceptual Design Support Tool," Proceedings of the 23rd British HCI Group Annual Conference on People and Computers: Celebrating People and Technology, 2009, pp. 447-452.
Hagbi N., et al., "In-Place Sketching for Content Authoring in Augmented Reality Games," IEEE Virtual Reality Conference (VR), 2010, pp. 91-94.
Hettiarachchi A., et al., "FingerDraw: More Than a Digital Paintbrush," Proceedings of 4th Augmented Human International Conference, 2013, pp. 1-4, ACM, New York.
Huynh D.N.T., et al., "Art of Defense: A Collaborative Handheld Augmented Reality Board Game," Sandbox '09, Proceedings of ACM SIGGRAPH Symposium on Video Games, 2009, Aug. 4-6, 2009, pp. 135-142, ACM, New York.
Igarashi T., et al., "Teddy: A Sketching Interface for 3D Freeform Design," Proceedings of the 26th Annual Conference on Computer Graphics and Interactive Techniques, Jul. 1999, pp. 409-416.
Kasahara S., et al., "Second Surface: Multi-user Spatial Collaboration System based on Augmented Reality," Proceeding of SIGGRAPH Asia 2012 Emerging Technologies, 2012, pp. 4, ACM, New York.
Pan J., et al., Sketch-Based Skeleton-Driven 2D Animation and Motion Capture Transactions on Edutainment VI, Lecture Notes in Computer Science, 2011, pp. 164-181, vol. 6758.
Paper Camera—Android Apps on Google Play, Paper Camera, JFDP Labs—Aug. 8, 2013, [Retrieved dated on Aug. 22, 2013], Retrieved from the Internet < URL: https://play.google.com/store/apps/details?id=com.dama.papercamera >, 3 pages.
Rother C., et al., ""GrabCut"—Interactive Foreground Extraction using Iterated Graph Cuts," Proceedings of SIGGRAPH, Aug. 2004, pp. 309-314.
Ryokai K., et al., "I/O Brush: Drawing with Everyday Objects as Ink," Proceedings of Conference on Human Factors, 2004, Apr. 24-29, 2004, pp. 1-8, ACM, New York.
Seichter H., "CAADRIA2003," Proceedings of Eighth International Conference on Computer-Aided Architectural Design Research in ASIA, 2003, Oct. 18-20, 2003, pp. 209-219.
Sykora D., et al., "Sketching Cartoons by Example," Eurographics Workshop on Sketch-Based Interfaces and Modeling, 2005, Igarashi T., et al., (Ed.,), 8 pages.
Thorne M., et al., "Motion Doodles: An Interface for Sketching Character Motion," Proceedings of ACM SIGGRAPH, Aug. 2004, pp. 424-431.
Vignette—Android Apps on Google Play, Weavr—Aug. 10, 2013, [Retrieved dated on Aug. 22, 2013], Retrieved from the Internet < URL: https://play.google.com/store/apps/details?id=uk.co.neilandtheresa.NewVignette >, 3 pages.
Xin M., et al., "Napkin Sketch—Handheld Mixed Reality 3D Sketching," Proceedings of ACM Symposium on Virtual Reality Software and Technology, 2008, Oct. 27-29, 2008, pp. 223-226, ACM, New York.
Zivkovic Z., et al., "Efficient adaptive density estimation per image pixel for the task of background subtraction," Pattern Recognition Letters, 2006, pp. 773-780, vol. 27.

(56) References Cited

OTHER PUBLICATIONS

Fischer, J., et al., "Detecting Dynamic Occlusion in Front of Static Background for AR Scenes", Virtual Environments. Proceedings of the Eurographics Workshop.Eurographics, May 22, 2003, pp. 153-161.
Gervautz, M., et al., "Anywhere Interfaces Using Handheld Augmented Reality", Computer, IEEE, US, vol. 45, No. 7, Jul. 2012, pp. 26-31.
International Search Report and Written Opinion—PCT/US2014/037932—ISA/EPO—Mar. 2, 2015.
Kim, K., et al., "Keyframe-based Modeling and Tracking of Multiple 3D Objects," The International Society of Magnetic Resonance (ISMAR), 2010, pp. 193-198.
Lee, G.A., et al., "Immersive Authoring of Tangible Augmented Reality Applications", Proceedings of the Thrid IEEE and ACM International Symposium on Mixed and Augmented Reality (ISMAR 2004), 10 pages.
Mattingly, W.A., et al., "Robot Design Using Unity for Computer Games and Robotic Simulations", 17th International Conference on Computer Games IEEE, Jul. 30, 2012, pp. 56-59.
McDonald, C., et al., "Replacing a Mouse with Hand Gesture in a Plane-Based Augmented Reality System", Proceedings of 16th International Conference on Vision Interface, Jun. 11, 2003, 10 pages.
Fan W., et al., "A Survey on Development and Application of Augmented Reality Computer Engineering and Applications", Dec. 31, 2012, pp. 8319-8325.
Yuan S., et al., "Mobile Augmented Reality Technology Applied on Mobile Phone Platform", Computer Science, No. 6A, vol. 39, Jun. 30, 2012, pp. 493-498.
Bergig O et al., "In-Place Augmented Reality", Virtual Reality, XP019911642, vol. 15, No. 2-3, Mar. 27, 2010, pp. 201-212.
Ueda S., et al., "Mixed Reality Type Wallpaper Simulation in a Wall Region Extracted from Freehand Video", IEICE Technical Report vol. 111, No. 379, Pattern recognition and media understanding, Japan, Corporation Institute of Electronics, Information and Communication Engineers, Jan. 12, 2012, PRMU2011-169, MVE2011-78 (Jan. 2012), pp. 1-6.

\* cited by examiner

305

| Editing Modes and Subsections | |
|---|---|
| Geometry Mode 1410 | Basic Edits 1411 |
| | Extrusion Edits 1412 |
| | Depth Edits 1413 |
| | Revolving Edits 1414 |
| | Multiple Parts Edits 1415 |
| | Skeletonization Edits 1416 |
| | Symbolic Edits 1417 |
| | Semi 3-D Edits 1418 |
| Location Mode 1420 | Rotating Edits 1421 |
| | Moving Edits 1422 |
| Animation Mode 1430 | Basic Edits 1431 |
| | Path Edits 1432 |
| | Stop Motion Edits 1433 |
| Extra Property Mode 1440 | Sound Edits 1441 |
| | Physical Behavior Edits 1442 |
| Play Mode 1450 | Skeleton Edits 1451 |
| | Hand Gesture Edits 1452 |
| | Snapshot 1453 |
| | Video Sequence Export 1454 |

FIG. 14

SYSTEMS AND METHODS OF GENERATING AUGMENTED REALITY (AR) OBJECTS

CROSS-REFERENCE TO RELATED APPLICATIONS

This application claims priority to Provisional U.S. Application Ser. No. 61/823,295, entitled "AR SKETCH & PLAY: COMBINING PAPER-BASED SKETCHING AND MULTI-TOUCH INTERACTION FOR AR APPLICATIONS," filed May 14, 2013, which is assigned to the assignee hereof and expressly incorporated herein by reference.

BACKGROUND

Aspects of the disclosure relate to augmented reality (AR) objects, specifically creating AR objects from physical sketches or physical objects, for use in AR interactions.

The current generation of mobile AR applications can be limited when it comes to interaction with a user. For example, many applications only allow end-users to manipulate (e.g., select, move, game actions) or navigate (e.g., turn around, come closer) predefined 3-D content overlaid on a printed target. The predefined content may be traditionally authored offline by artists, designers or developers and integrated as part of the application and cannot be modified in real-time. These approaches limit the flexibility and creative potential of AR experiences.

BRIEF SUMMARY

Methods, systems, computer-readable media, and apparatuses for generating and capturing an Augmented Reality (AR) object in real-time are presented. Additionally, the AR object can be modified in real-time using multi-touch interactions by a user.

Certain embodiments are described that allow a user to combine physical sketching and multi-touch interaction for mobile AR applications. In some embodiments the physical sketching for generating AR object in real-time can be paper-based.

In some embodiments, a method for generating one or more augmented reality (AR) objects by a mobile device includes capturing an image of one or more target objects, wherein the one or more target objects are positioned on a pre-defined background. The method also includes segmenting the image into one or more areas corresponding to the one or more target objects and one or more areas corresponding to the pre-defined background. The method additionally includes converting the one or more areas corresponding to the one or more target objects to a digital image. The method further includes generating one or more AR objects corresponding to the one or more target objects, based at least in part on the digital image.

In some embodiments, segmenting the image further comprises subtracting the pre-defined background from the image.

In some embodiments, editing the one or more AR objects in response to a user input.

In some embodiments, the editing also includes dividing at least one of the one or more AR objects into a plurality of AR parts, receiving user input associated with a designated AR part from the plurality of AR parts, and manipulating the designated AR part based on the received user input.

In some embodiments, manipulating the designated AR part based on the received user input includes at least one of: adding depth to the designated AR part based on a determined finger pressure on a display of the mobile device, rotating the designated AR part based on a user gesture performed on the display of the mobile device, assembling the designated AR part into one or more layers, moving the designated AR part into one or more locations displayable on the display of the mobile device, or extruding the designated AR part.

In some embodiments, one of the one or more target objects comprises a two-dimensional (2-D) sketch.

In some embodiments, one of the one or more target objects comprises a three-dimensional (3-D) object.

In some embodiments, one of the one or more target objects is coplanar with the pre-defined background.

In some embodiments, the pre-defined background is a feature tracking target.

In some embodiments, the method also includes refining one of the one or more areas corresponding to the one or more target objects.

In some embodiments, the one or more AR objects are generated based on detection of a two-dimensional (2-D) blob within the captured image, the detection of the 2-D blob based on a surface reflectance associated with the one or more target objects positioned on the pre-defined background.

In some embodiments, the pre-defined background includes a horizontal tracking area and a vertical tracking area.

In some embodiments, the method also includes displaying, on a display of the mobile device, the one or more AR objects in real-time.

In some embodiments, an apparatus for generating one or more AR objects includes memory, an image capturing module configured to capture an image of one or more target objects, wherein the one or more target objects are positioned on a pre-defined background, an image processing module configured to segment the image into one or more areas corresponding to the one or more target objects and one or more areas corresponding to the pre-defined background, and a processor coupled to the memory, image capturing module, and image processing module. The processor may be configured to convert the one or more areas corresponding to the one or more target objects to a digital image and generate one or more AR objects corresponding to the one or more target objects, based at least in part on the digital image.

In some embodiments, one or more non-transitory computer-readable media storing computer-executable instructions for generating one or more Augmented Reality (AR) objects that, when executed, cause one or more computing devices included in a mobile device to capture an image of one or more target objects, wherein the one or more target objects are positioned on a pre-defined background, segment the image into one or more areas corresponding to the one or more target objects and one or more areas corresponding to the pre-defined background, convert the one or more areas corresponding to the one or more target objects to a digital image, and generate one or more AR objects corresponding to the one or more target objects, based at least in part on the digital image.

In some embodiments, an apparatus for generating one or more Augmented Reality (AR) objects includes means for capturing an image of one or more target objects, wherein the one or more target objects are positioned on a pre-defined background, means for segmenting the image into one or more areas corresponding to the one or more target objects and one or more areas corresponding to the predefined background, means for converting the one or more areas corresponding to the one or more target objects to a digital image, and means for generating one or more AR objects corresponding to the one or more target objects, based at least in part on the digital image.

BRIEF DESCRIPTION OF THE DRAWINGS

Aspects of the disclosure are illustrated by way of example. In the accompanying figures, like reference numbers indicate similar elements, and:

FIG. 14 is a table illustrating different editing modes, according to some embodiments;

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Augmented reality (AR) can be a live, direct or indirect, view of a physical, real-world environment whose elements are augmented by computer-generated sensory input such as, but not limited to, sound, text, graphics, video, and location (e.g., Global Navigation Satellite System (GNSS)) data.

By using AR technology such as object recognition, the information about the surrounding real world of the user becomes interactive and able to be digitally manipulated. Artificial information about the user's environment and its objects can be overlaid on the real world.

Embodiments of the present invention are directed towards an augmented reality (AR) object, specifically combining physical sketching and multi-touch interaction for mobile AR applications. Additionally, the AR object can be modified in real-time using multi-touch interactions by a user.

Certain embodiments are described that allow a user to combine physical sketching and multi-touch interaction for mobile AR applications. In some embodiments the physical sketching for generating AR objects in real-time can be paper-based.

According to some embodiments, a user may be able to interact with real content (e.g., paper-based) directly on a marker (e.g., target area). In some instances, the AR object can be based on real content that is created online by the end-user. This may be in contrast to current implementations, where virtual content is created offline by developers via a digital tool.

As a result, embodiments of the present invention allow for a more intuitive way for users to create AR objects and content without the need of a traditional digital tool. Additionally, using the concept of pop-up books and collage artwork, the AR content creation can become more accessible to end-users. Furthermore, the embodiments of the present invention may offer new approaches for AR interaction, which can include capturing information from the real world in real-time.

Figure 1:
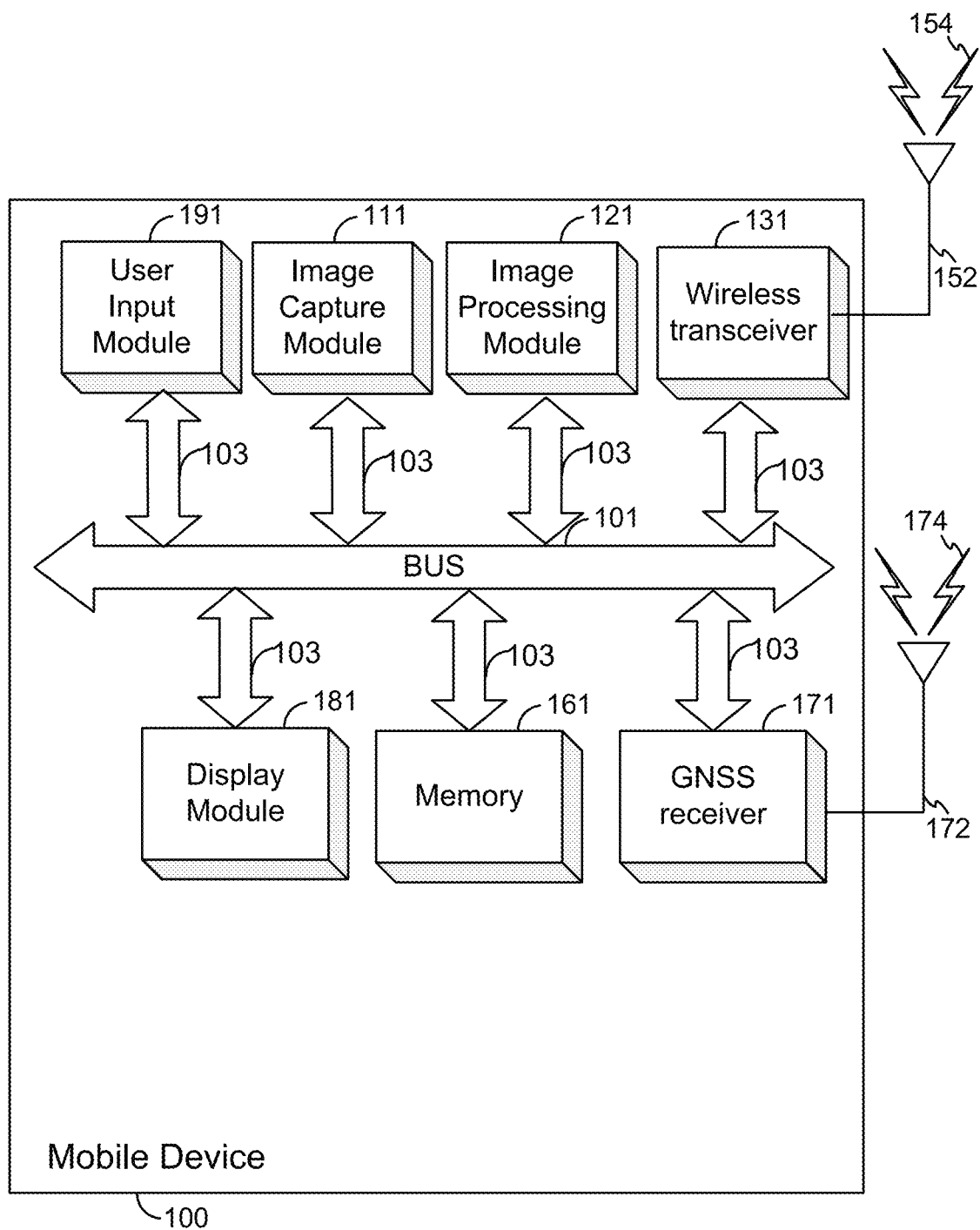
FIG. 1 is a block diagram illustrating an exemplary mobile device according to some embodiments.

FIG. 1 is a block diagram illustrating an exemplary mobile device 100 according to some embodiments. The mobile device 100 includes an image capture module 111 coupled to an image processing module 121. The image processing module 121 can be one or more general-purpose processor(s). Additionally, the image processing module 121 may be connected to a bus 101 by a bus interface 103, and the image capture module 111 may be connected to the bus 101 by the bus interface 103, and memory 161 connected to the bus 101 by the bus interface 103.

The image processing module 121 may also be coupled to a display module 181 via the bus interface 103 and bus 101. Additionally, the image capture module 111 and the image processing module 121 can be connected to a user input module 191 via the bus interface 103 and bus 101. The image processing module 121 may be configured to detect and capture an image of a target object from incoming image data or video data received from the image capture module 111. The image of the target object may include an object positioned against a pre-defined background. The image processing module 121 can compare the pre-defined background with the image of the target object and determine a sketch based on the comparison. Subsequently, the image processing module 121 can generate an AR object based on the sketch for display on the display module.

The bus interface 103 may be integrated with the image processing module 121, image capture module 111, and memory 161 with which they are associated. In various embodiments, functions may be stored as one or more instructions or code in memory 161, such as on a computer-readable storage medium, such as RAM, ROM, FLASH, or disc drive, and executed by image processing module 121. Memory 161 may be a processor-readable memory and/or a computer-readable memory that stores software code (programming code, instructions, etc.) configured to cause the image processing module 121 to perform the functions described. In other embodiments, the functions described may be performed in hardware.

Furthermore, in some embodiments, the mobile device 100 may include a global navigation satellite system (GNSS) receiver 171 capable of receiving GNSS signals 174 via a GNSS antenna 172 coupled to the GNSS receiver 171. The GNSS receiver 171 may also process, in whole or in part, the GNSS radio signals 174 and use the GNSS signals 174 to determine the location of the mobile device 100. The GNSS receiver 171 can assist the mobile AR applications with location-based information.

Moreover, in some embodiments, the mobile device 100 may also include a wireless transceiver 131 connected to the bus 101 by a bus interface 103. The wireless transceiver 131 may be operable to receive a wireless signal 154 via antenna 152. The wireless signal 154 may be transmitted via a wireless network. In some embodiments, the wireless network may be any wireless network such as, but not limited to, the Internet, a Personal Access Network (PAN), or a cellular network (e.g. a GSM, WCDMA, LTE, CDMA2000 network). In some embodiments, antennas 152 and 172 may be the same antenna. It can be appreciated that while two antennas are depicted in FIG. 1, in other embodiments, any number of antennas may be present on the mobile device 100 and the wireless transceiver 131 and GNSS receiver 171 may share one or more these antennas for purposes of communication. The wireless transceiver 131 can assist the mobile AR application with communication with the network (e.g., internet).

The mobile device 100 may be a cellphone, smartphone, PDA, tablet, laptop, tracking device or some other wireless supportable and moveable device and may be referred to as a mobile terminal, mobile station (MS), terminal, device, wireless device, user equipment (UE), SUPL Enabled Terminal (SET), target device, target or by some other name.

According to some embodiments, the image capture module 111 can include a lens and an image sensor that can be configured to capture an image of one or more target objects and a pre-defined background, where the one or more target objects are positioned on the pre-defined background. In some instances, the captured images may be videos, and the videos may be captured in real-time. Accordingly, the term image as described herein can include video and audio data. The image capture module 111 may include one or more digital still cameras, one or more video cameras, one or more microphones, or any combination thereof. Examples of the image capture module 111 may include, but is not limited to, a RGB camera, a depth camera, a stereo camera, etc. The term "camera" may also refer to multiple cameras that may be of different types (e.g., an RGB camera and a depth camera).

Figure 16:
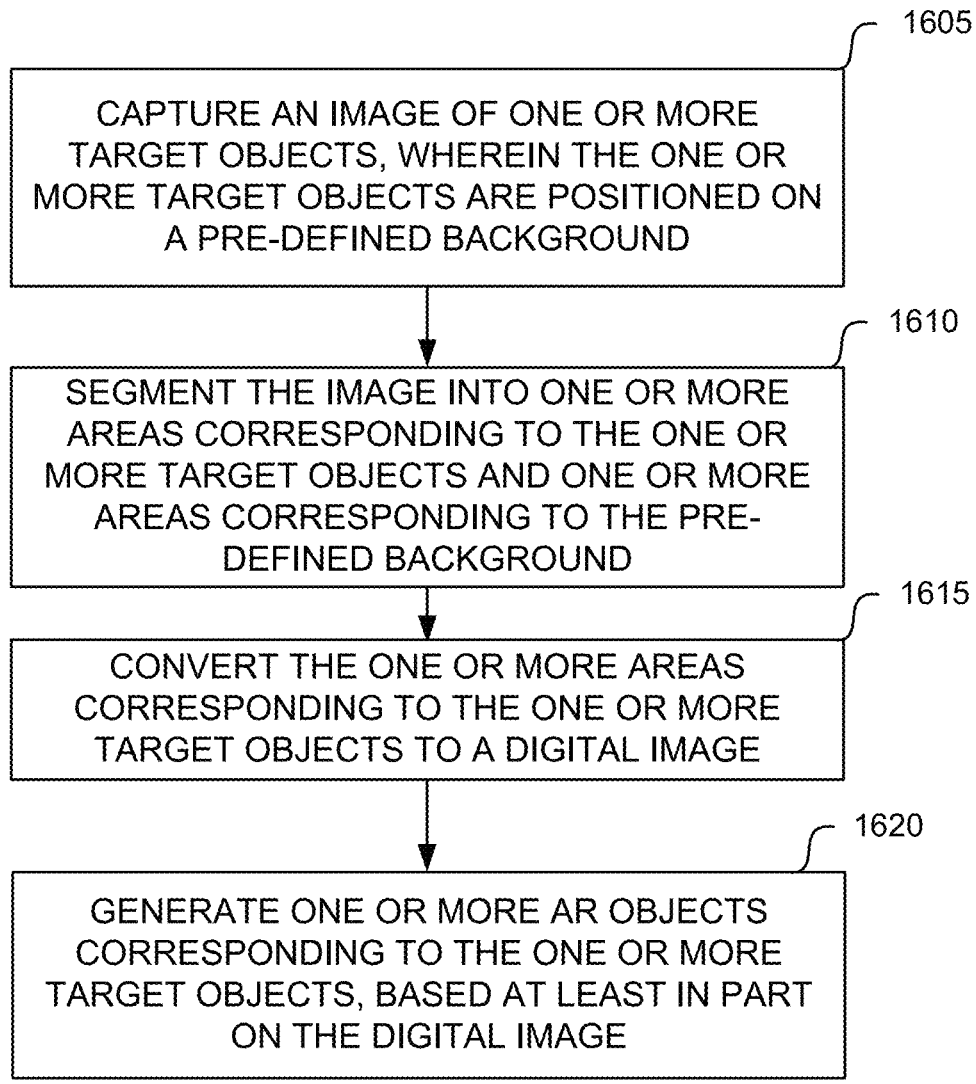
FIG. 16 is a flow diagram illustrating a method for capturing a target AR object, according to one embodiment.

According to some embodiments, the image processing module 121 can be configured to detect the one or more target objects from the image data received by the image capture module 111 and generate augmented image data for display on the display module 181, as described with respect to method 1600 in FIG. 16. In order to generate the augmented image data, the image capture module 111 may segment the captured image into one or more areas corresponding to the one or more target objects and one or more areas corresponding to the pre-defined background. The image capture module 111 may then convert the one or more areas corresponding to the one or more target objects to a digital image. The image capture module 111 may continue to generate one or more AR objects corresponding to the one or more target objects. In some embodiments, the one or more target objects can include a hand-drawn sketch by a user.

Figure 7:
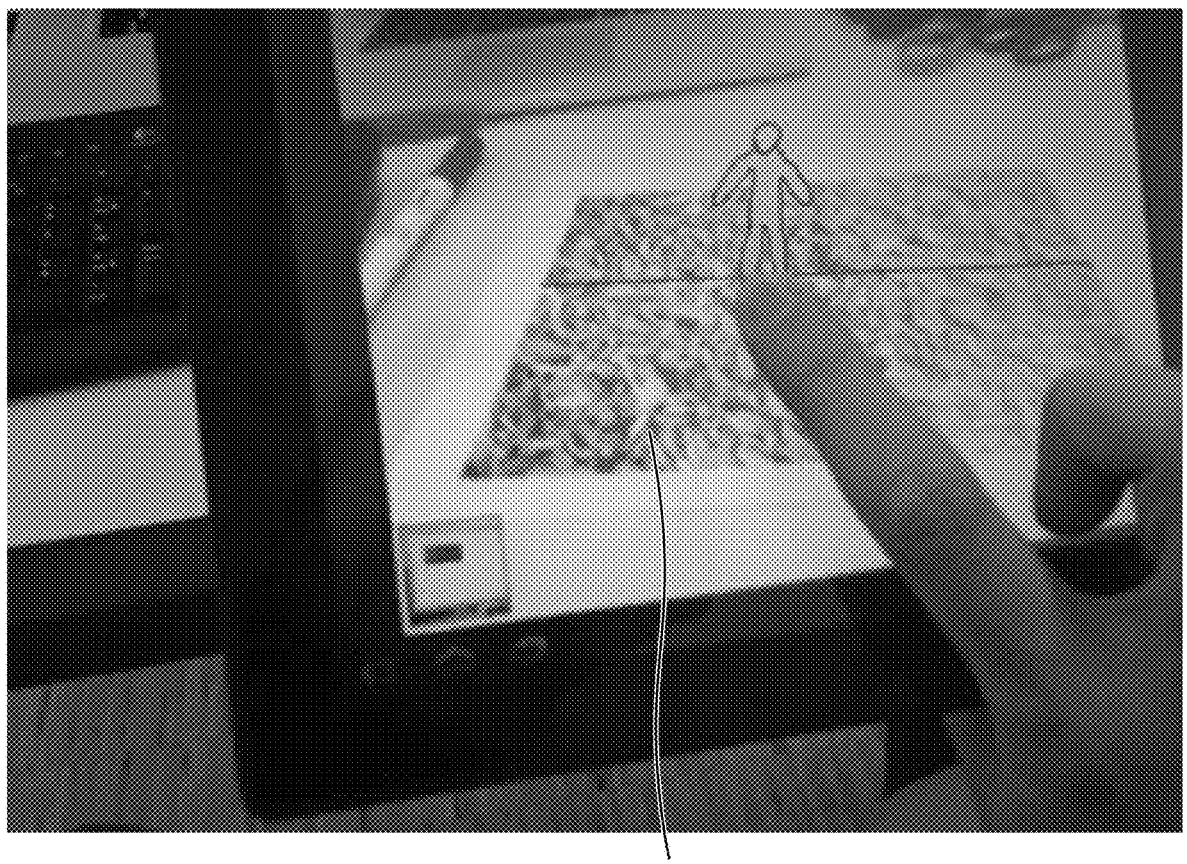

In some instances, the display module 181 is configured to display the generated AR objects. For example, the display module 181 may include a display screen on the mobile device or other visual display device (e.g., projector, head-mounted display, vehicle display, smart watch, camera display, etc.). In some embodiments, the generated AR objects can be displayed as an embedded AR object within an augmented image, as illustrated in FIG. 7.

In some embodiments, the user input module 191 enables a user to control (e.g., animate) the three-dimensional AR object displayed via the display module 181. For example, the user input module 191 may include one or more physical controls, such as one or more switches, buttons, joysticks, or keys. As other examples, the user input module 191 can include a touchscreen of the display module 181, a speech interface, a gesture recognizer, another user input mechanism, or any combination thereof. In some embodiments, the user input module 191 may be within a different device, separate from the mobile device 100.

In some instances, at least a portion of the image processing module 121 may be implemented via dedicated circuitry. In other embodiments, at least a portion of the image processing module 121 may be implemented by execution of computer executable code that is executed by the image processing module 121. To illustrate, the memory 161 may include a non-transitory computer readable storage medium storing program instructions that are executable by the image processing module 121. The program instructions may include code for detecting one or more target objects within image data received from an image capture module 111, and code for generating one or more AR objects corresponding to the one or more target objects.

Figure 2:
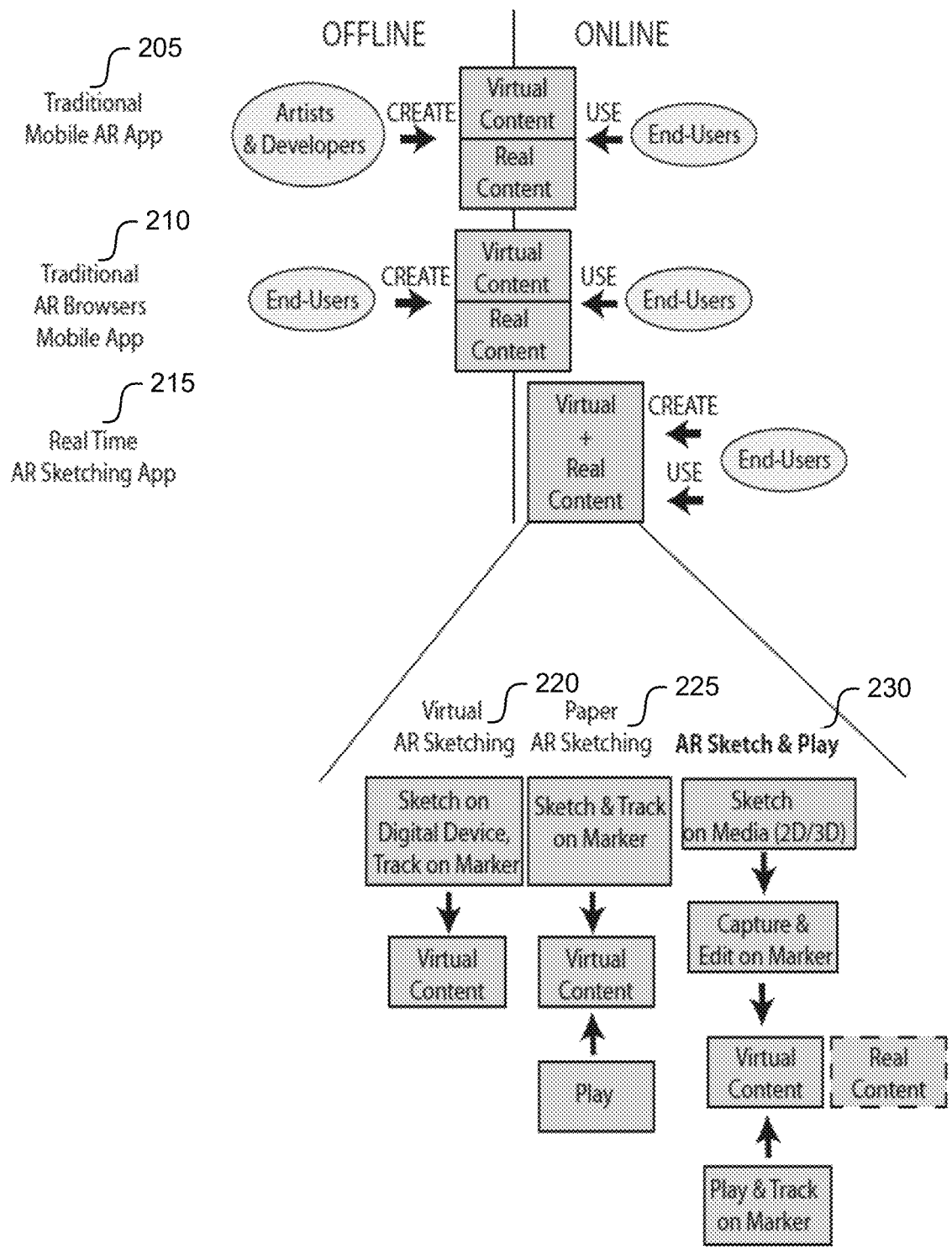
FIG. 2 illustrates embodiments of the present invention in comparison to different type of AR applications from a perspective of end-users versus developers.

FIG. 2 compares different types of AR applications as seen from an end-user or developer perspective. FIG. 2 further illustrates embodiments of the present invention that represent a class of AR applications for real-time AR authoring and/or real-time AR sketching.

According to some embodiments, methods are disclosed for allowing end-users to use AR applications in order to create content in real-time. As illustrated in the real-time AR sketching application 215, end-users can create and use virtual AR content.

In contrast, in a traditional mobile AR application 205, artists and developers create the virtual AR content offline, which may be integrated into the mobile AR application 205. End-users may then manipulate or navigate this pre-defined virtual AR content online, but they are not able to modify or edit the content during real time.

Alternatively, in a traditional AR browser's mobile application 210, end-users can create virtual and real content, but the content is still generated offline, on a separate platform, using traditional digital authoring tools. It can be appreciated that the term "offline" as used herein can refer to creating content on a platform other than the one the end-user may ultimately use to interact with the AR content. For example, in the traditional AR browser's mobile application 210, which may be only tailored for desktop platforms, end-users can create pictures, place marks and 3-D models on their desktop, add them on a server using a web authoring tool, and then experience the content at a later time using a mobile device or other device other than the desktop. As illustrated in this example, even though current implementation may allow end-users to create virtual and real content, the creation is still limited to just the offline creation with professional digital tools.

Embodiments of the present invention describe AR tools and mobile AR user interfaces that enable a user to create content that is both online and user-generated, as illustrated in the real-time AR sketching application 215. It can be appreciated that the term "online" as used herein can refer to creating content in real-time, on the same platform that the end-user may ultimately use to interact with the AR content. In some instances, the real-time AR sketching application 215 can allow a user to create real-time virtual content using a mobile AR user interface. For example, the mobile AR user interface can receive an input (e.g., user drawing on the tablet, photo editing, 3-D modeling), and based on the input, update the virtual content in real-time.

Additionally, embodiments of the present invention can combine physical sketching with virtual content in AR. In some instances, the combining can be as a result of unifying traditional sketching with multi-touch interactions on a mobile AR interface, as illustrated in a more detailed description of the real-time AR sketching application 215 at the bottom of FIG. 2.

The real-time AR sketching application 215 can include a virtual AR sketching 220 mode, a paper AR sketching 225 mode and an AR sketch and play 230 mode. Using these modes, the real-time AR sketching application 215 enables physical sketching (e.g., real world) and touch interaction for enabling an end-user to create and use both virtual and real content.

According to some embodiments, the method used by the real-time AR sketching application 215 can be based on the concept of using a dedicated space (e.g., tracking area) to capture real-world content. For example, a tracking area (e.g., Qualcomm Natural Feature Tracking (NFT) Marker) can be used as a dedicated space to capture the real-world content. Additionally, the tracking area can be used to edit the content (e.g., capture-and-play space). In some instances, the real-time AR sketching application 215 can capture a real object and create a digital counterpart (e.g., virtual) that can be manipulated on the tracking area. The tracking area (e.g., tracking area 305) is further discussed in FIG. 3.

In the traditional virtual AR sketching 220 mode, a user can sketch on the digital device to create an AR object. Additionally, the user can track the created AR object on the marker (e.g., an object with known geometry, tracking area) in order to create the virtual content. According to some embodiments, one or more of the following modules in the mobile device 100 can be used for tracking: image capture module 111 (e.g., digital cameras and/or other optical sensors), image processing module 121, accelerometers, GNSS receiver 171, gyroscopes, solid state compasses, and wireless transceiver 131.

In the traditional paper AR sketching 225 mode, a user can both sketch and track the AR object on the marker (e.g., tracking area) to create the virtual content. Additionally, the user can play with the AR object by manipulating the sketch on the marker, while the sketch is being tracked.

Current implementations may focus solely on a full 3-D reconstruction. In contrast, embodiments of the present invention can use techniques that enable two-dimensional (2-D) to two-and-a-half-dimensional (2.5-D) reconstructions. For example, 2-D to 2.5-D objects such as pop-up books and collage artwork can be didactic elements in teaching creative work. Accordingly, by having fewer dimensions, the application can be easier to use by users (e.g., children) and can be more imaginative for the user. Additionally, 2-D to 2.5-D objects can have better functionality when used for gaming, education, entertainment, animation/puppetry, artistic work, etc.

In the AR sketch and play 230 mode, which embodies the implementations described herein, a user can sketch on media using 2-D to 2.5-D objects. Additionally, the user can capture and edit on the marker (e.g., tracking area) to create the virtual content. Furthermore, the user can play (e.g., manipulate) and the generated one or more AR objects.

Figure 3:
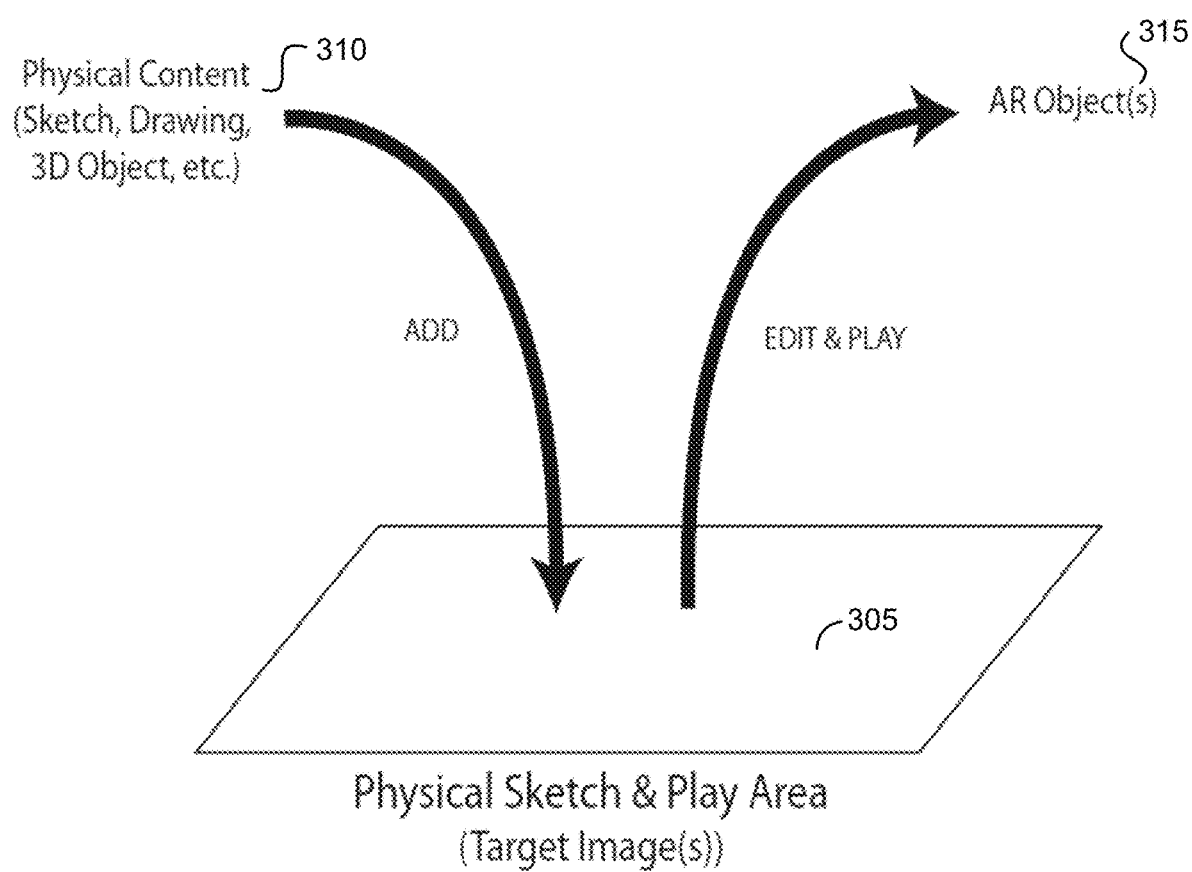
FIG. 3 illustrates embodiments of the present invention using a tracking area.

FIG. 3 illustrates embodiments of the present invention in a spatial environment. For example, as illustrated in FIG. 3, the real-time AR sketching application 215 can use a marker (e.g., tracking area 305, physical sketch and play area of FIG. 3) to extract, capture and play at the same time. Additionally, the marker (e.g., tracking area 305) can be used to generate real-time content in three-dimensions (3-D).

In some instances, a user can add physical content 310 (e.g., sketch, drawing, 3-D physical object) on the tracking area 305, and the image capture module 111 and image processing module 121 can generate one or more AR objects 315 based on the physical content 310 positioned (e.g., placed) on the tracking area 305. For example, FIG. 16 describes an exemplary method for generating the one or more AR objects based on the physical content placed on the tracking area 305. Subsequently, the user can edit and play with the generated AR object(s).

For example, in some embodiments, the real-time AR sketching application 215 can be implemented using a capture or edit mechanism, which may include editing techniques for the marker-based environment. In some embodiments, the capture or edit mechanism may interact with the image processing module 121 to allow for editing of the marker-based environment. As a result, complex computer vision (CV) 3-D modeling and acquisition may not be required to edit the AR environment.

Figure 4:
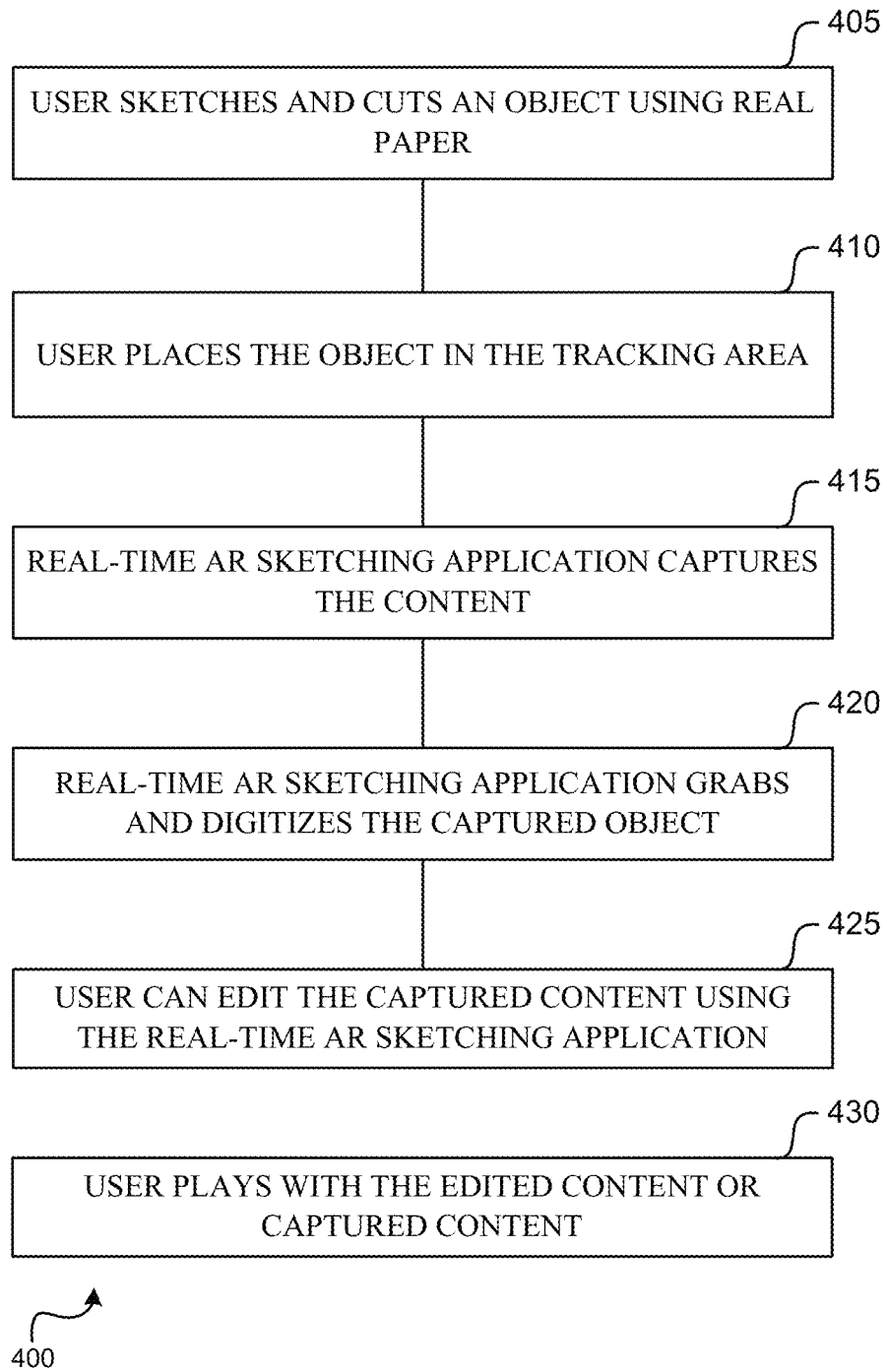
FIG. 4 is a flow diagram illustrating a method for combining physical sketching and multi-touch interaction for mobile AR applications, according to one embodiment.

FIG. 4 is a flow diagram illustrating an embodiment of a method 400 for combining physical sketching and multi-touch interaction for mobile AR applications, according to one embodiment.

Figure 5:
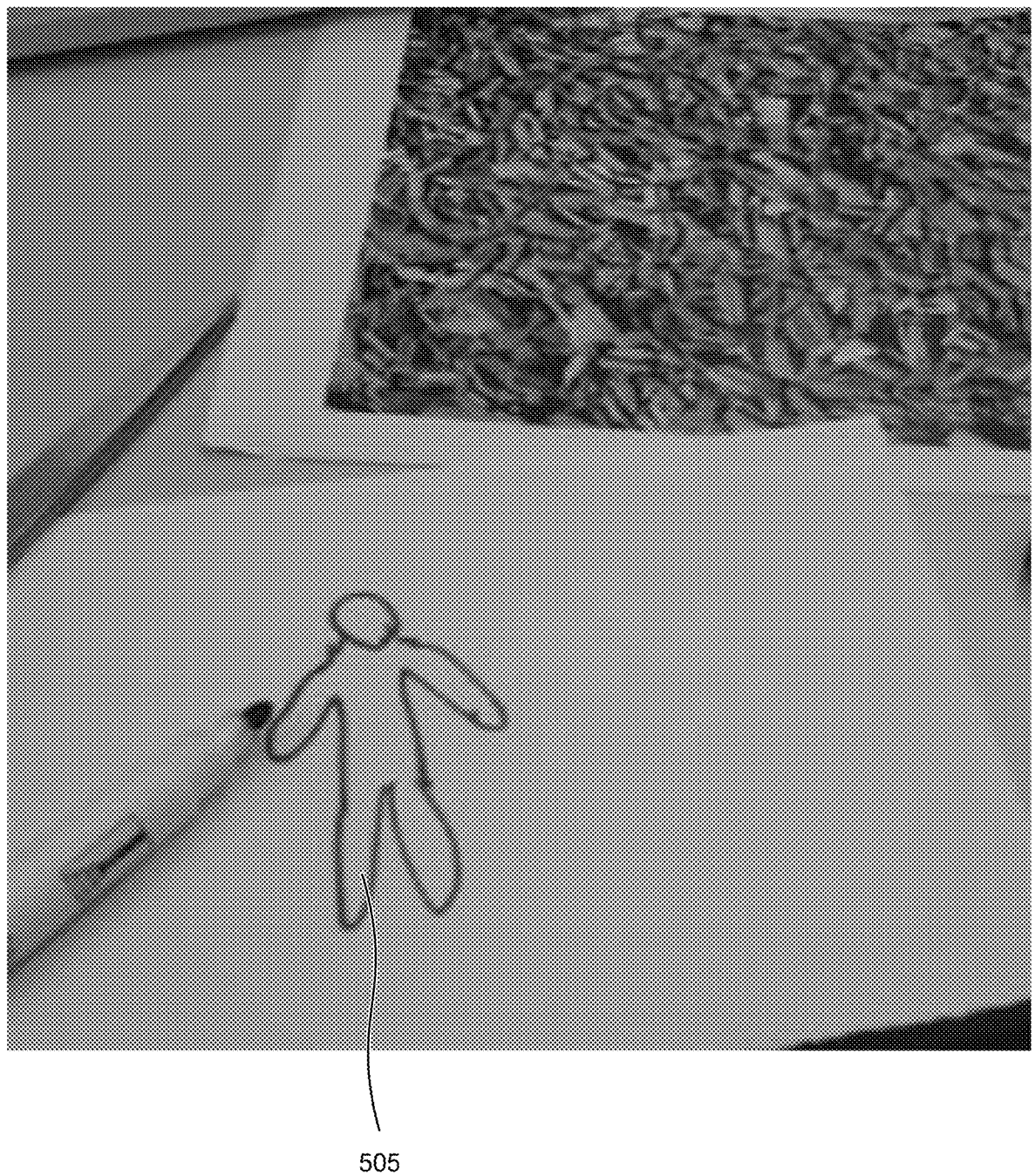
FIGS. 5-7 illustrate examples of the method for combining physical sketching and multi-touch interaction for mobile AR applications.

At block 405, a user can sketch and cut an object using real paper. Alternatively, the user can draw or glue the object. FIG. 5 illustrates an example of a user sketching an object (e.g., human FIG. 505) using real paper.

Figure 6:
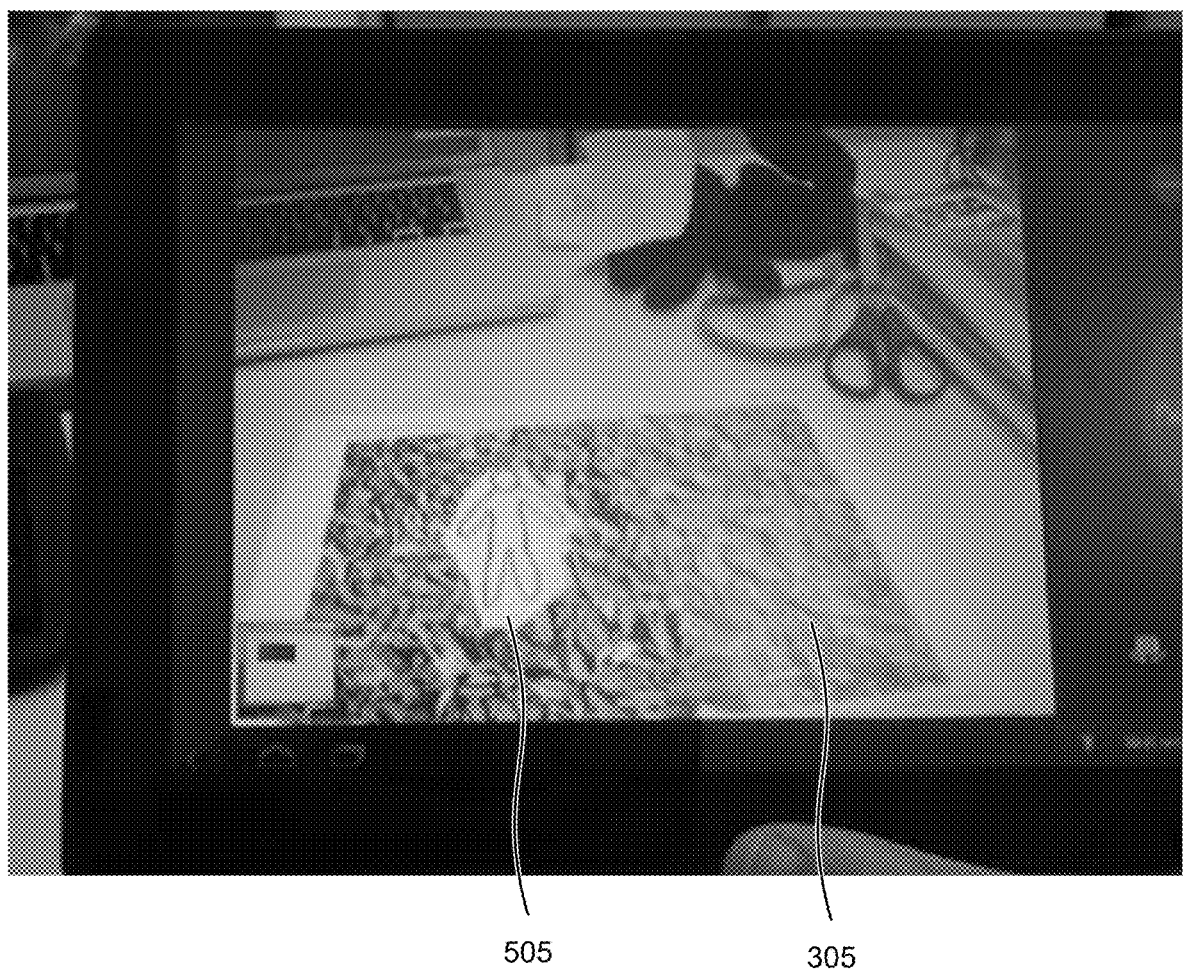

At 410, the user can place the object in the tracking area 305 (e.g., capture-and-play space). FIG. 6 illustrates an example of a user placing the object (e.g., human FIG. 505) in the tracking area 305. As illustrated in FIG. 6, the tracking area 305 can be a predefined background. Some examples of the tracking are 305 include, but is not limited to, AR tracking targets, the Qualcomm NFT marker, etc.

At 415, the real-time AR sketching application 215 can capture the content. The flow diagram in FIG. 16 further describes a method of capturing the content. Additionally, as previously mentioned, the image capture module 111 can be configured to detect the one or more target objects positioned (e.g., placed) on the tracking area 305.

At 420, the real-time AR sketching application 215 can grab and digitize the captured object. In some instances, the real-time AR sketching application 215 can digitize the sketch from block 405 and block 410 and convert it to a digital image. The image processing module 121 can be configured to detect the one or more target objects in the incoming video/image data received from the image capture module 111 and generate one or more AR objects corresponding to the one or more target objects for display on the display module 181.

It can be appreciated that these steps may be performed in real-time by the mobile device 100.

In other instances, the image processing module 121 may be configured to detect a target image within the video/image data received from the image capture module 111.

The image processing module 121 may be configured to generate a sketch and augmented reality (AR) data based on the detected target image.

Figure 12:
FIG. 12 illustrates an AR editing method using the mobile interface, according to one embodiment.
Figure 13:
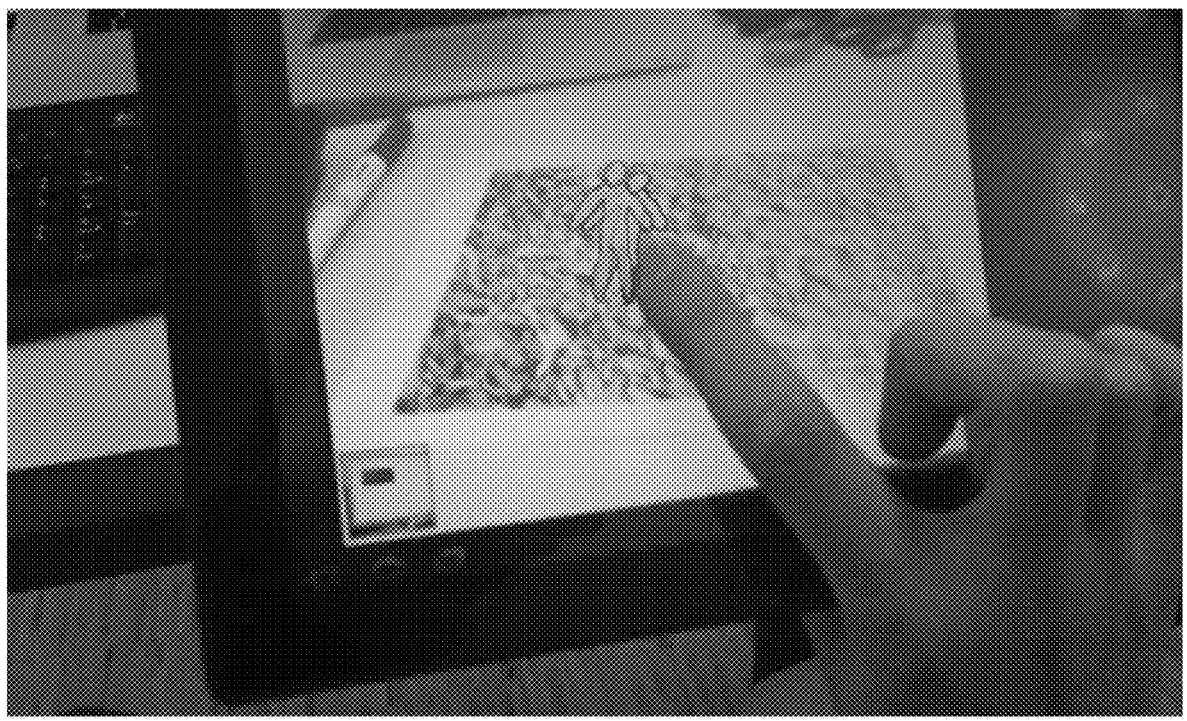
FIG. 13 illustrates an AR editing method using the mobile interface, according to another embodiment.

At 425, the user can edit the captured content using the real-time AR sketching application 215. The user interface can be a multi-touch interface. FIGS. 12-13 illustrate different editing methods using the real-time AR sketching application 215. Methods of editing the captured content can include, but are not limited, to: modifying the geometry of the captured content; modifying the initial placement of the captured content on the marker (tracking area 305); creating animation with the object; and adding extra properties (e.g., sounds, physical behavior) to the object. These editing methods are further described in the table illustrated in FIG. 14.

At 430, the user can play with the edited content or captured content. FIG. 7 illustrates an example of editing and/or playing with the captured content. Playing with the content can include, but is not limited, to; animation; manipulation; and video game interactions with the content.

FIGS. 5-7 illustrate examples of the method 400 for combining physical sketching and multi-touch interaction for mobile AR applications. As illustrated in FIGS. 3 and 5, a user can sketch an object (e.g., human FIG. 505), as previously described in block 405. Additionally, FIG. 6 illustrates an example of placing the object (e.g., human FIG. 505) on the tracking area 305, as previously described in block 410. Furthermore, FIG. 7 illustrates an example of editing or playing with the captured content on the tracking area 305, as previously described in block 425 and block 430.

The sketch object, as used in block 405, can include a range of different media items, including, but not limited to, a drawing, a sketch, and a 3-D physical object placed on the tracking area 305. In some instances, the 3-D physical object can only be captured in 2-D. The sketch object 405 may need to be clearly distinguishable and co-planar to the tracking area 305. Additionally, the sketched object may be placed in a way that covers only a part of the tracking area 305 in order to ensure stable tracking. It can be appreciated that the sketched object is an example of the one or more target objects.

Figure 8:
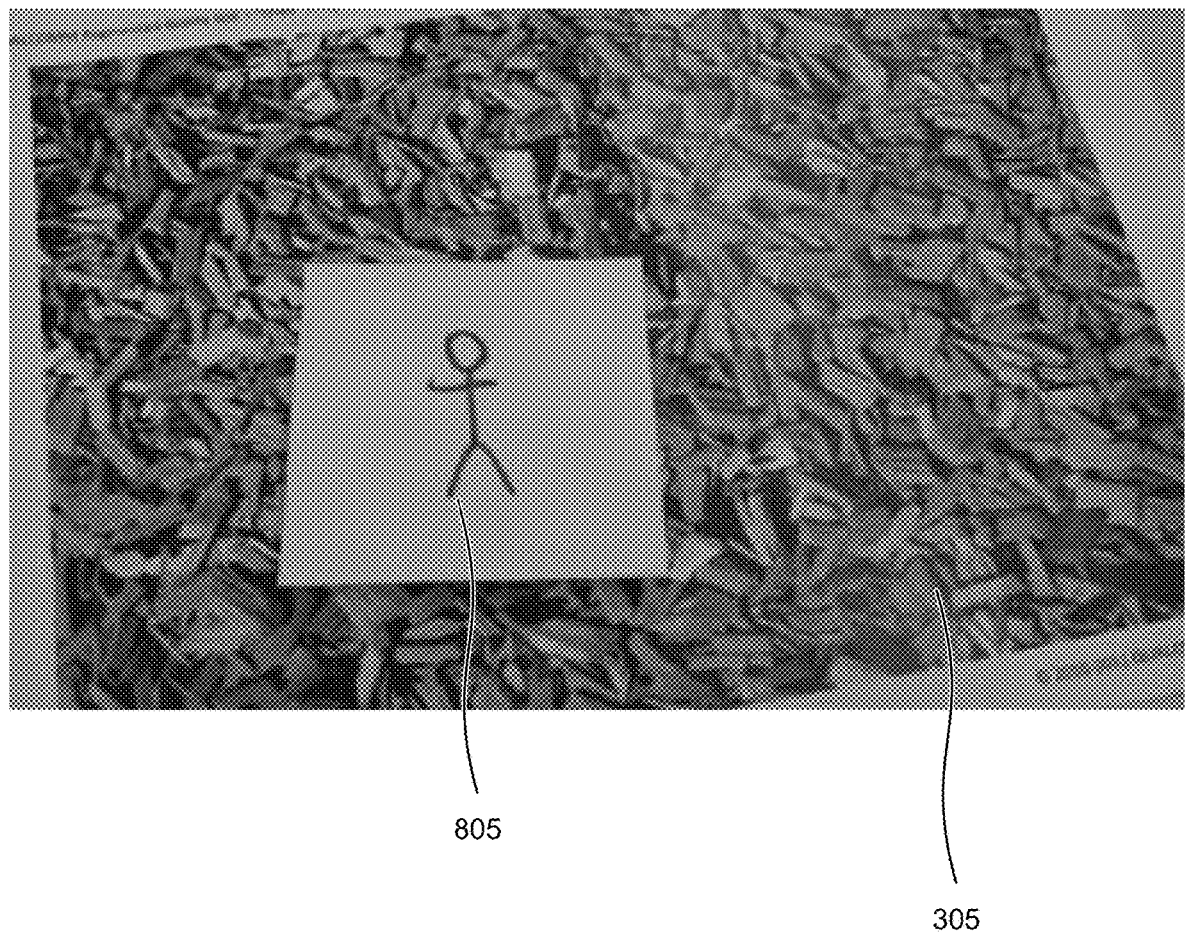
FIGS. 8-10 illustrate difference type of sketches that can be used according to some embodiments.
Figure 9:
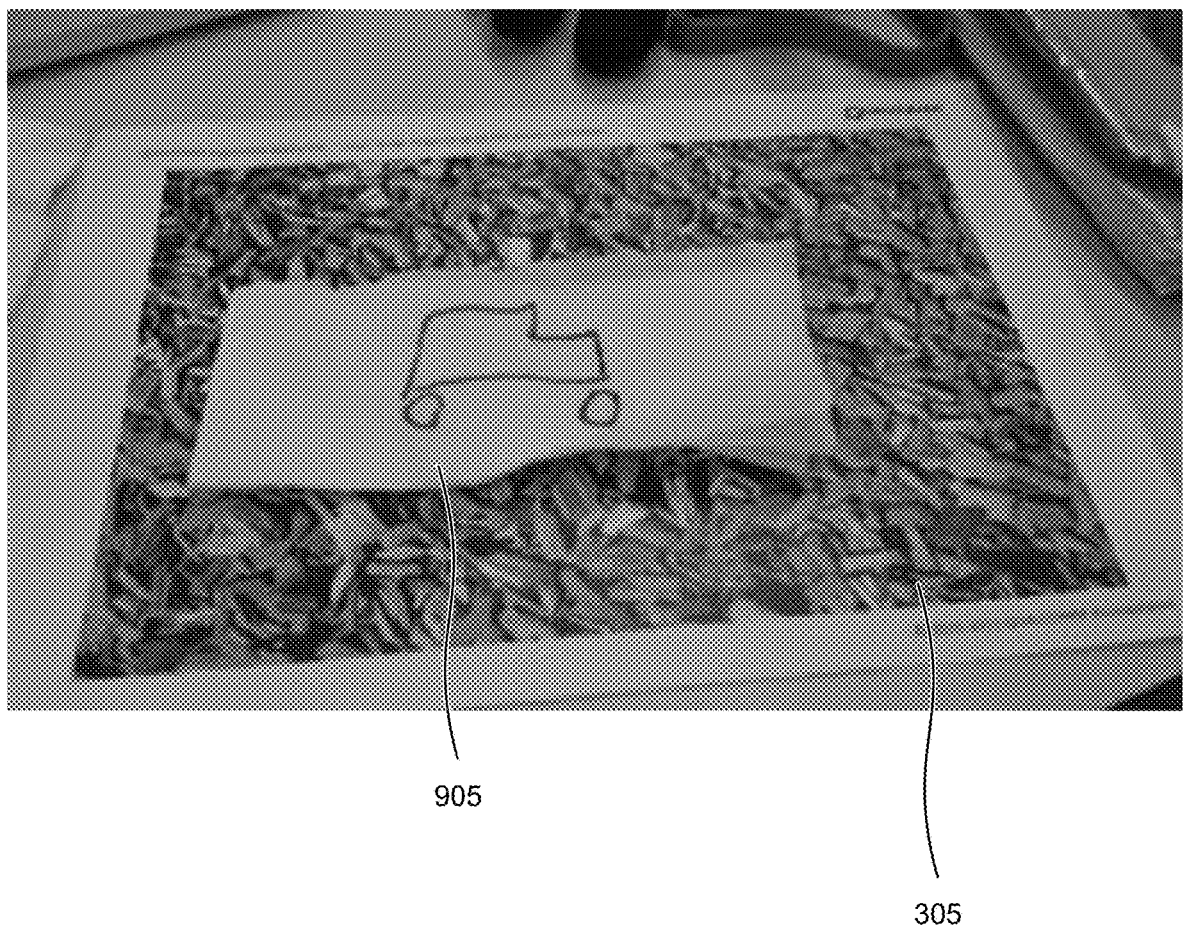
Figure 10:
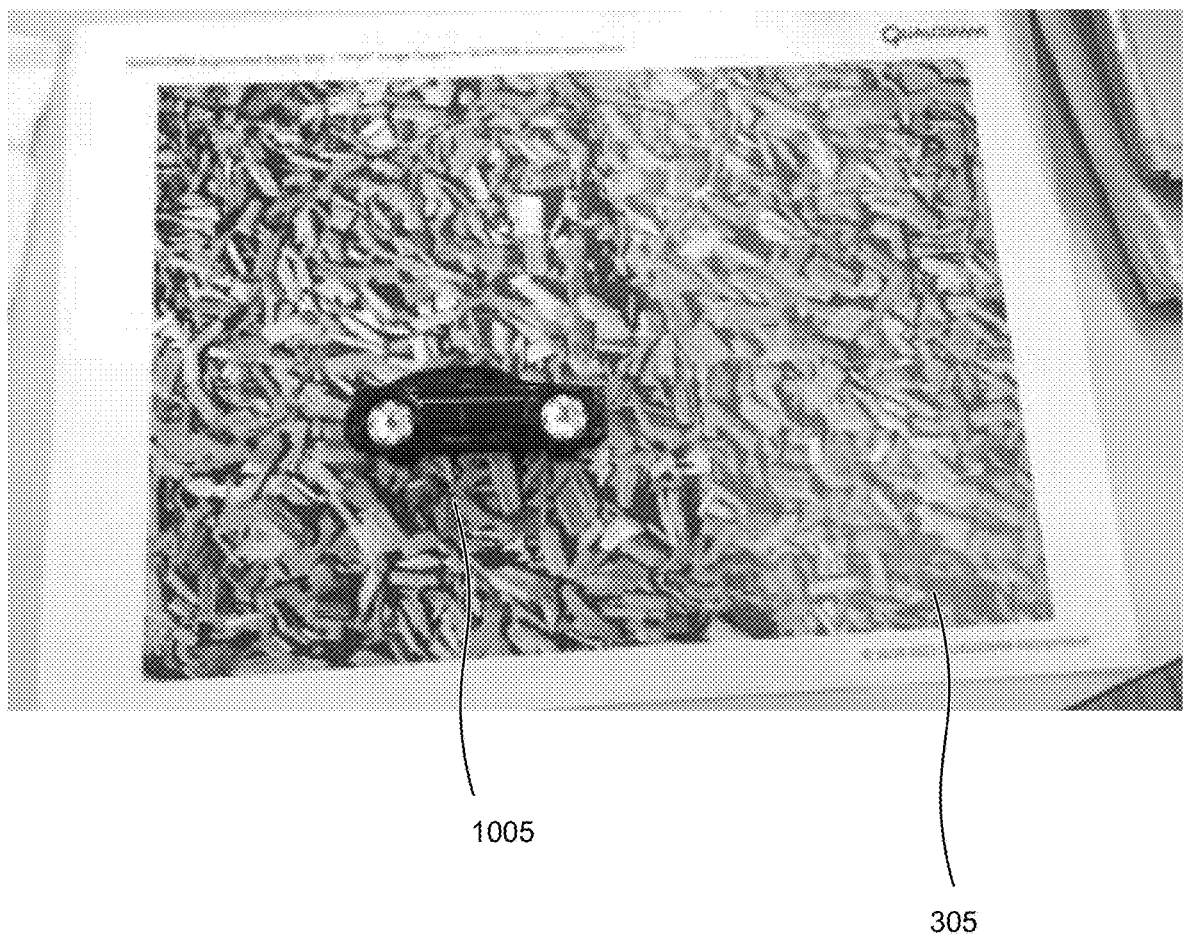

FIGS. 8-10 illustrate various examples of sketched objects that can be used according to some embodiments. For example, a user can sketch a stick FIG. 805 and place the object on the tracking area 305, as illustrated in FIG. 8. Alternatively, a user can sketch a vehicle 905 and place the sketch on the tracking area, as illustrated in FIG. 9. In another embodiment, the user can place a 3-D object, such as toy car 1005 on the tracking area as illustrated in FIG. 10.

As further described in the flowchart of FIG. 16, the real-time AR sketching application 215 can capture an object (e.g., stick FIG. 805, vehicle 905, 3-D toy car 1005) placed on the tracking area 305 and generate an AR object based on the captured object. As illustrated, the sketch object can include a range of different media items, including, but not limited to, a drawing, a sketch, and a 3-D physical object.

Figure 11:
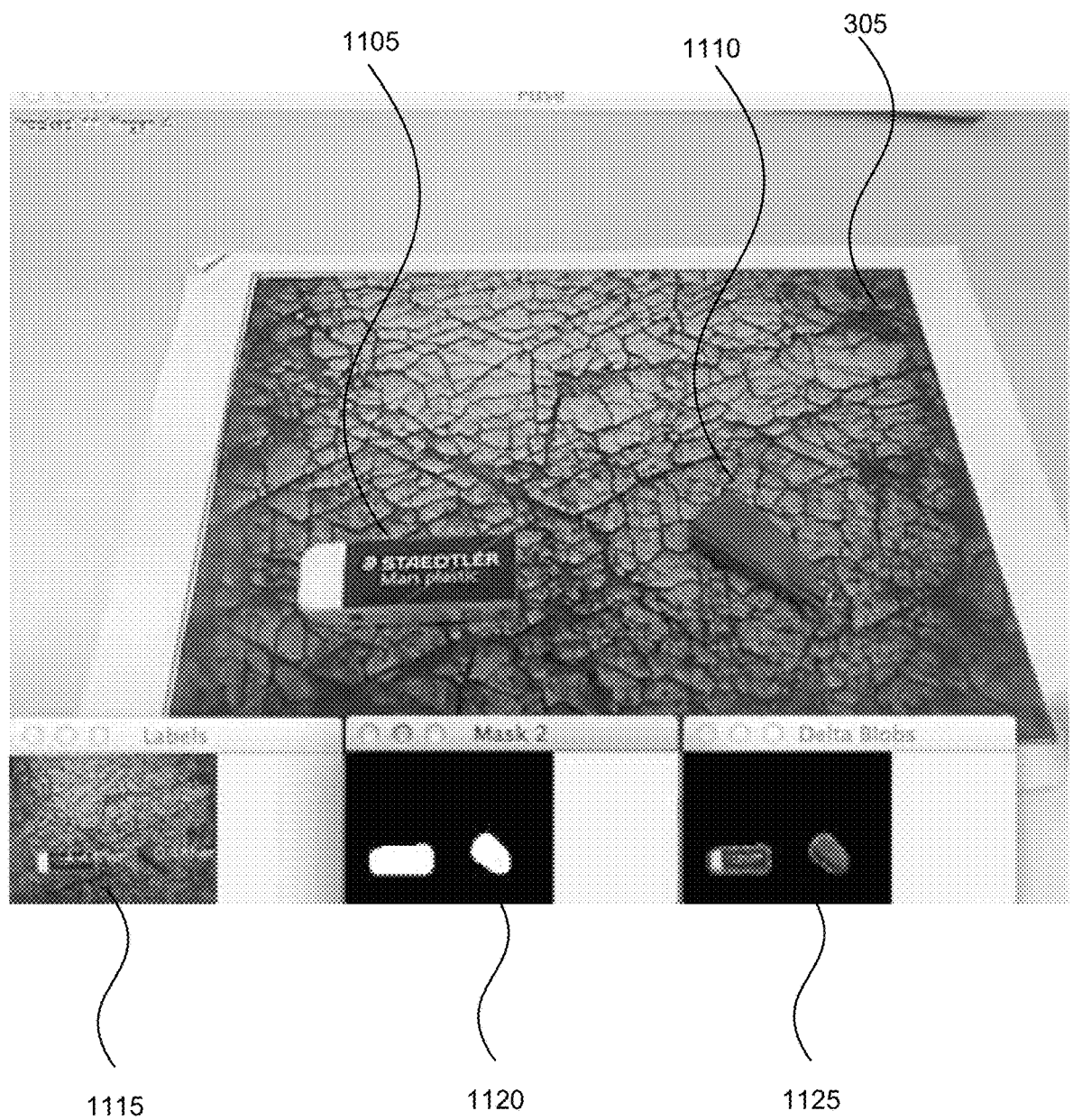
FIG. 11 illustrates an exemplary method of placing and capturing the sketched object or physical object in the tracking area, according to one embodiment.

FIG. 11 illustrates an exemplary method of placing and capturing multiple objects in the tracking area 305, as previously described in block 410 and block 415. For example, the real-time AR sketching application 215 can capture multiple objects, when a first object 1105 and a second object 1110 are positioned (e.g., placed) on the tracking area 305. Methods similar to the method described in FIG. 16 can be used to capture multiple objects. In some instances, a user may place the one or more sketched objects in a way that covers only a part of the tracking area 305 in order to ensure stable tracking. Additionally, the sketched object or physical object should preferably be placed in the center. In another embodiment, the real-time AR sketching application 215 may only capture the largest item in the image.

After one or more objects are placed on the tracking area 305, as illustrated in image 1115 captured by the image capture module 111, the real-time AR sketching application 215 can use a background subtraction technique to determine the target object(s) positioned on the pre-defined background, as illustrated in background subtraction image 1120. In some instances, the real-time AR sketching application 215 can use a high octave in scale space for an interactive performance, where the interactive performance is based on guidance from a user. Additionally, the background subtraction technique can be complemented with a local light estimation to get a pure albedo of the object.

Furthermore, intrinsic image decomposition or a basic light estimation can be applied to recover reflectance of the surface from the captured object(s). In some instances, non-reflective media can be preferred and easier to capture. Once the one or more objects are captured, the real-time AR sketching application 215 can generate one or more 2-D blobs based on the captured reflectance of the surface from the captured object(s), as illustrated in captured objects image 1125.

Moreover, an image segmentation algorithm (e.g., Grab-Cut algorithm) can be used to refine the contour or shape of the blob (e.g., contour of an object, such as a sketched character). One or more AR objects corresponding to the one or more target objects may then be generated.

FIGS. 12-13 illustrate different editing methods using the real-time AR sketching application 215, as previously described in block 425. FIG. 12 illustrates the contour selection technique used for editing the one or more AR objects. Alternatively, FIG. 13 illustrates the hotspot selection technique used for editing the one or more AR objects. Furthermore, the different editing modes can be controlled using the real-time AR sketching application 215.

As illustrated in FIG. 14, the different editing modes can include: a geometry mode 1410 (e.g., modifying the geometry of the object captured); a location mode 1420 (e.g., modifying the initial placement of the object on the marker); animation mode 1430 (e.g., creating animation with the object); extra property mode 1440 (e.g., adding extra properties to the object such as sound mode and physical behavior); and a play mode 1450 (local interaction, visualize or record). In some instances, the selection of the different editing modes can be done using buttons, gestures and/or hotspots.

The geometry mode 1410 can further include: basic edits 1411; extrusion edits 1412; depth edits 1413; revolving edits 1414; multiple parts edits 1415; skeletonization edits 1416; symbolic edits 1417; and semi 3-D edits 1418. In some instances, the selection of the different edits in the geometric mode can be operated using buttons, gestures and/or hotspots.

Basic edits 1411 include generating a 2-D planar polygonal model from the captured object (e.g., convex hull, polygonization).

Extrusion edits 1412 include allowing a user to extrude part of the object based on diagonal motion inputs on the surface of the object.

Depth edits 1413 include adding some depth on parts of the captured object by a user touching the object. In some instances longer pressure can result to higher depth. Additionally, a negative/positive button can switch the mode.

Revolving edits 1414 can include a user drawing a revolving axis and performing a swipe gesture to create the object.

Multiple parts edits 1415 can include assembling different drawings to specified different layers of an object (e.g., apples on a tree) or different face of an object (e.g., faces of a house).

Skeletonization edits 1416 can include using morphological methods on the outer hull of the captured target (e.g., extracted blob).

Symbolic edits 1417 can include recognizing a symbol using a shape descriptor. Additionally, the real-time AR sketching application 215 can constrain the applied interactions to the resulting reconstruction.

Semi 3-D edits 1418 can include creating 3-D reconstruction from the strokes found in the sketch.

In another mode, the location mode 1420 can include rotating edits 1421 and moving edits 1422. For example, the rotating edits 1421 can include methods of rotating the captured object from a specific axis center using swipe gestures in different directions. Additionally, a user may click on a default hotspot to change the center of rotation.

In the moving edits 1422 component of the location mode 1420, the captured object can be moved on the tracking area 305. In some instances, a ray cast between a sketch (e.g., sketch 505) and a marker can define the location. Furthermore, the different guides used to move the AR object can include: surface of the marker; along the tangent (or bi-tangent) of the X and Y orientation of the marker; perpendicular plane (i.e., Z-axis) on the marker; and front or back of the marker (e.g., border planes around the marker). As previously mentioned, the selection of the different edits in any of the modes can be operated using buttons, gestures and/or hotspots.

In another mode, the animation mode 1430 can include basic edits 1431, path edits 1432 and a stop motion edits 1433. The basic edits 1431 can predefine animation behavior such as spinning, jumping, looping, etc. The path edits 1432 can allow a user to record a path for a digitized sketch. The stop motion edits 1433 can allow a user to define an animated sequence for a digitized sketch.

In another mode, the extra property mode 1440 can add extra properties to the object such as, but not limited to: sound edits 1441 and physical behavior edits 1442. Sound edits 1441 can add sound to the object by using the recording button. In some instances the recording button can be near the digitized sketch. Physical behavior edits 1442 can add physical behavior to the digitized object, such as jumping, running, etc.

In yet another mode, the play mode 1450 can be based on a skeleton edits 1451 and hand gesture edits 1452. The play mode 1450 can include the skeleton edits 1451 with strokes, where nodes are detected based on a distance transforms in the model and generate a simplified inverse kinematics (IK) model. For example, IK model in 3-D animation can connect game characters physically to the surrounding, such as feet landing firmly on top of terrain.

In some embodiments, in the play mode 1450, a snapshot 1453 of AR content may be captured and/or recorded allowing for recording control. In other words, AR may be used to create a type of hybrid/real-virtual stop motion animation, hybrid Machinima, storytelling, etc. The captured video sequence may be exported using a video sequence export 1454 function.

Additionally, in the play mode 1450, an AR object (e.g., animated figure) can be modeled with a skeleton of rigid segments connected with joints, called a kinematic chain. The kinematics equations of the figure can define the relationship between the joint angles of the figure and its configuration. In some instances, it is easier to animate AR objects by defining the spatial configuration of a figure by its moving parts, or arms and legs, rather than directly manipulate joint angles. Therefore, inverse kinematics can be used in the real-time AR sketching application 215 to easily animate AR objects by an end-user.

For example, the skeleton edits 1451 can allows an end-user to move the hand of a 3-D human AR object to a desired position and orientation and have an algorithm in the real-time AR sketching application to automatically select the proper angles of the wrist, elbow, and shoulder joints.

In the hand gesture edits 1452 of the play mode 1450, the nodes of the AR objects can be animated with hand gestures. For example, the real-time AR sketching application 215 can map the fingertips of the user to the outer node points in the skeleton of the AR object. Additionally, the hand gesture edits 1452 can be based on the semi-3-D mode, where the real-time AR sketching application 215 can map hand gestures to a semi-3-D reconstructed model.

Moreover, different default modes can be further added such as: animate content (e.g., popup, storytelling book); record (e.g., user can move around the animation and record it, puppet mode); and game mode (e.g., physics can be applied, object can be manipulated).

According to some embodiments, a user can edit AR object on a head mounted display (HMD) using human body gestures. For example, the hand gesture edits 1452 can be implemented with an HMD. An HMD can include one or more egocentric cameras mounted on the glass frame for the image capture module 111. An HMD can also include optical sensors, accelerometers, GNSS receiver 171, gyroscopes, solid state compasses, radio-frequency identification (RFID) and wireless transceiver 131. An HMD can have a transparent display area within a user's field of view, as the display module 181, in which a user can view both physical objects and virtual objects. Using the built-in cameras as the user input device, an HMD can capture hand gestures according to user's hand gesture edits 1452.

In the HMD example, the HMD can provide AR functionality by overlaying physical objects viewed by a user with digital content (e.g., text, pictures, video) associated with the physical objects, or associated with the user's location and/or context, for example.

Furthermore, although embodiments are described herein with respect to a HMD, those of skill in the art will appreciate that other forms of head-mounted displays may be utilized. For example, embodiments described herein may be implemented with respect to one or more contact lenses that a user may wear and/or may be implemented in another form of display through which a user may perceive a field of view.

Embodiments of the present invention can further extend the capture, edit and play methods described herein.

For example, the capture method can be extended to do non-target-based capture such as taking a picture of a magazine, or recording the face of a person. In some instances, the captured image may need to be post-processed to get a blob shape, and therefore it may less reliable than a target-based capture. Additionally, in the target-based capture method, a blob shape can be captured with less processing and done in real-time.

Additionally, the capture method can also acquire texture or color information from the real world (e.g., placing an object on the marker and digitizing the color of the object). Furthermore, the capture step can also be extended to capture dynamic content (e.g., capturing facial expression). In some instances, these extended capture methods may need post-processing.

The edit method can be extended to also include a way to create skeleton on the digitized sketch. For example, a user can build an articulated model which can later be animated.

The play method can be extended to include tracked content (e.g., hand, physical proxy object by the mean as Tangible User Interface). For example, a model of a car in the user's hand can be moved on the marker and the digitized content will be associated with it (i.e., when the hand moves, a digitized sketch of a vehicle will follow the motion of the hand).

Figure 15:
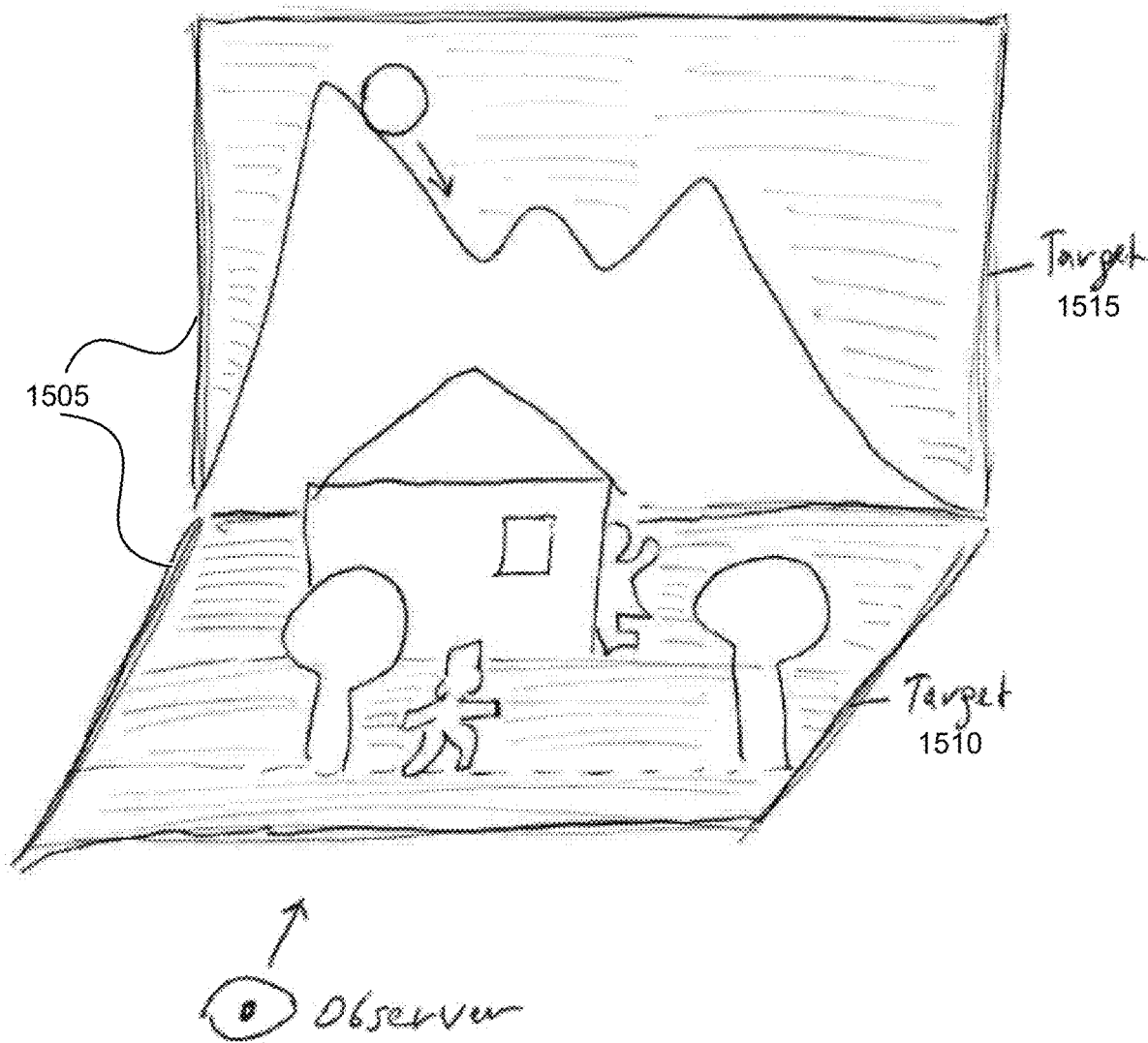
FIG. 15 illustrates using a 2.5-D stage to apply simplified physics in a 2-D layer, according to one embodiment.

FIG. 15 illustrates a 2.5-D stage for supporting and creating interactive puppet theater experiences and games, according to some embodiments. In some instances, by using an L-shaped marker arrangement 1505 with one horizontal tracking area 1510 and one vertical tracking area 1515. The L-shaped marker arrangement 1505 can assume a variety of camera positions from above at a skew angle, but also from the side, as a theater visitor would see a stage.

Additionally, the user can digitize various stage props (properties) such as trees, mountains, houses, furniture and so on. These digital props appear vertical on the stage. By using two tracking areas, the props can be placed in any layer chosen from a fixed number (e.g., 5) of layers of increasing depth (distance to the observer). The user can select the layer, adjust the left-right placement of the prop and create multiple copies.

Moreover, the user can then move objects (e.g., animals, other characters) through the scene and create animation paths using the methods described herein. The objects can move in a designated layer. In some instances the movement of the moving object can be stopped or modified based on the props on the path of the moving object. The movement can create an animation system similar to a puppet theater, which may be simple to use because it has very few degrees of freedom.

According to some embodiments, by using hand animated characters, a user can assign multiple AR objects (e.g., digitized drawings) to animation sequences. For example, a walking person could be animated with several (e.g., 2-3) foot poses. The real-time AR sketching application 215 can learn these sequences by placing the drawing sequence in a simple timeline. After establishing these animations, the user may invoke the animated character. The real-time AR sketching application 215 can also mirror the animation to turn a right walking sequence to a left walking sequence.

Furthermore, the 2.5-D stage, as illustrated in FIG. 15, can also apply simplified physics using a 2-D layer mechanism. For example, the real-time AR sketching application 215 can illustrate a rock rolling down a hill prop by moving the rock closer to the user by using the layers of the 2.5-D stage. By using layers and 2-D physics, the real-time AR sketching application 215 can compute the physical animation associated with the prop in real-time in the mobile device 100. In some instances, the real-time AR sketching application 215 can include the following physical animations: gravity, collision, friction, wind and water.

FIG. 16 is a flow diagram illustrating an embodiment of a method 1600 for capturing a target AR object, according to some embodiments. As illustrated in FIG. 11, the real-time AR sketching application 215 can captures real content (e.g., first object 1105, second object 1110) placed on an AR tracking target (e.g., tracking area 305) and transform the content to be used interactively with a mobile interface.

At block 1605, an image of one or more target objects is captured. The target objects may be positioned on a pre-defined background. The pre-defined background may be a marker or feature tracking target. The target objects can include, but is not limited to, a 2-D sketch or a 3-D object. The target objects can also be coplanar with the pre-defined background. The pre-defined background may include a horizontal tracking area and a vertical tracking area.

At block 1610, the image may be segmented into one or more areas corresponding to the one or more target objects and one or more areas corresponding to the pre-defined background. Segmenting the image can include subtracting the pre-defined background from the image.

At block 1615, the one or more areas corresponding to the one or more target objects may be converted to a digital image.

At block 1620, one or more AR objects are generated. The one or more AR objects may correspond to the one or more target objects, and may be generated based at least in part on the digital image. The one or more AR objects may be generated based on detection of a two-dimensional (2-D) blob within the captured image, the detection of the 2-D blob based on a surface reflectance associated with the one or more target objects positioned on the pre-defined background.

The one or more AR objects may be edited in response to a user input. The editing can include dividing at least one of the one or more AR objects into a plurality of AR parts. A user input may designate an AR part from the plurality of AR parts. The designated AR part may then be manipulated based on the received user input. Manipulating the designated AR part can include one or more of the following: adding depth to the designated AR part based on a determined finger pressure on a display of the mobile device, rotating the designated AR part based on a user gesture performed on the display of the mobile device, assembling the designated AR part into one or more layers, moving the designated AR part into one or more locations displayable on the display of the mobile device, or extruding the designated AR part.

In some embodiments, the one or more areas corresponding to the one or more target objects may be refined. The generated AR objects may then be displayed on a display of the mobile device.

Figure 17:
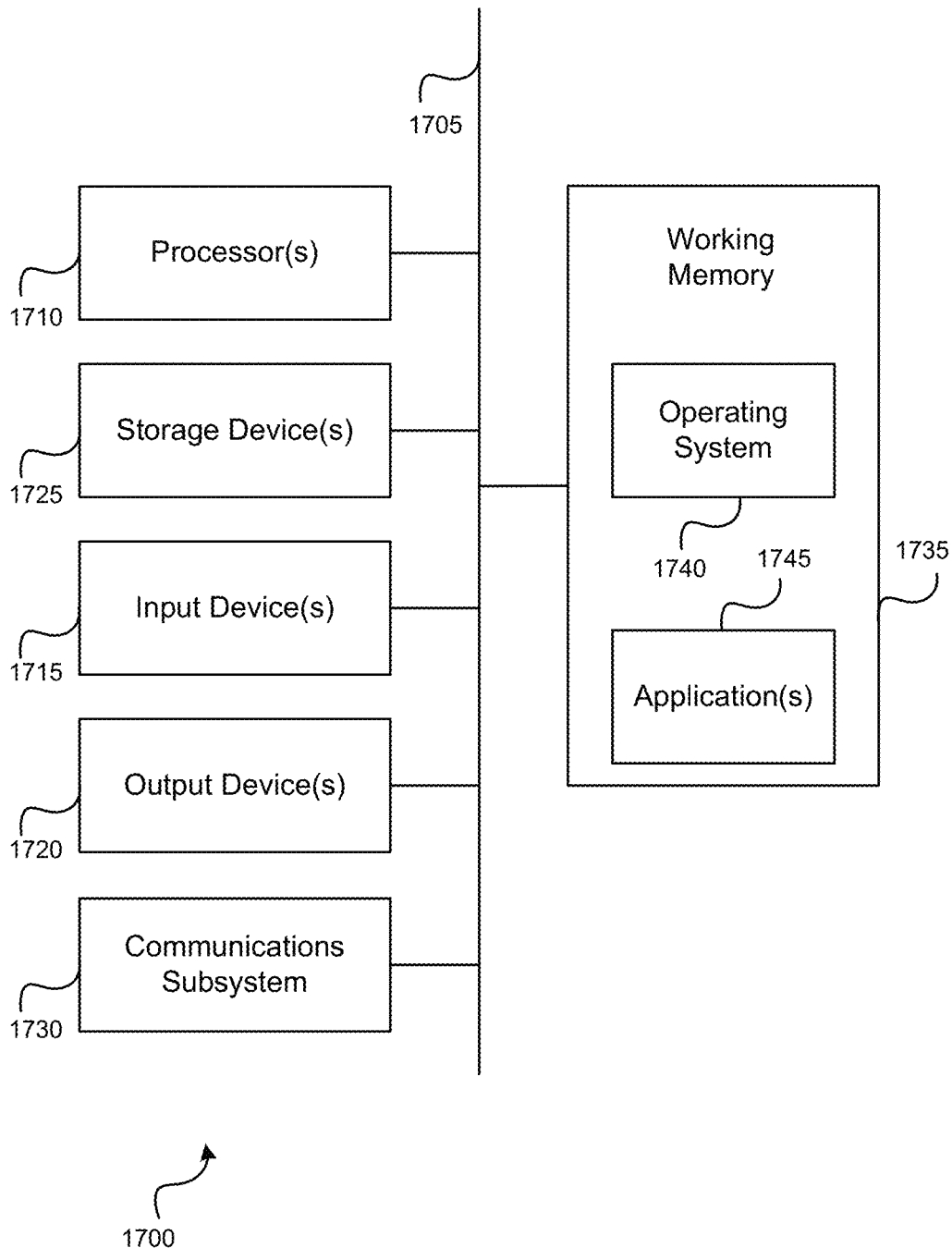
FIG. 17 illustrates an example of a computing system in which one or more embodiments may be implemented.

FIG. 17 illustrates an example of a computing system in which one or more embodiments may be implemented.

The computer system 1700 may further include (and/or be in communication with) one or more non-transitory storage devices 1725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1700 might also include a communications subsystem 1730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1730 may include one or more input and/or output communication interfaces to permit data to be exchanged with a network, other computer systems, and/or any other electrical devices/peripherals. In many embodiments, the computer system 1700 will further comprise a working memory 1735, which can include a RAM or ROM device, as described above. In some instances, the communication subsystem 1730 can be an example of the wireless transceiver 131 and the GNSS receiver 171 of the mobile device 100.

The computer system 1700 also can comprise software elements, shown as being currently located within the working memory 1735, including an operating system 1740, device drivers, executable libraries, and/or other code, such as one or more application(s) 1745, which may comprise computer programs provided by various embodiments, and/ or may be designed to implement methods, and/or configure systems, provided by other embodiments, as described herein. Merely by way of example, a portion of one or more procedures described with respect to the method(s) discussed above, such as the method 400 described in relation to FIG. 4 and the method 1600 described in relation in FIG. 16, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. In some instances, the working memory can 1735 can be an example of memory 161 of the mobile device 100.

A set of these instructions and/or code might be stored on a non-transitory computer-readable storage medium, such as the storage device(s) 1725 described above. In some cases, the storage medium might be incorporated within a computer system, such as computer system 1700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.), then takes the form of executable code. In some instances, the storage device(s) 1725 can be an example of memory 161 of the mobile device 100.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1700) to perform methods in accordance with various embodiments of the invention. According to a set of embodiments, some or all of the procedures of such methods are performed by the computer system 1700 in response to processor 1710 executing one or more sequences of one or more instructions (which might be incorporated into the operating system 1740 and/or other code, such as an application program 1745) contained in the working memory 1735. Such instructions may be read into the working memory 1735 from another computer-readable medium, such as one or more of the storage device(s) 1725. Merely by way of example, execution of the sequences of instructions contained in the working memory 1735 might cause the processor(s) 1710 to perform one or more procedures of the methods described herein. Additionally or alternatively, portions of the methods described herein may be executed through specialized hardware. Merely by way of example, a portion of one or more procedures described with respect to the method(s) discussed above, such as the method 400 and the method 1600, might be implemented by the processor 1710. In some instances, the processor 1710 can be an example of image processing module 121 of the mobile device 100. In some examples, the application program 1745 can be an example of the real-time AR sketching application 215.

The terms "machine-readable medium" and "computer-readable medium," as used herein, refer to any medium that participates in providing data that causes a machine to operate in a specific fashion. In an embodiment implemented using the computer system 1700, various computer-readable media might be involved in providing instructions/ code to processor(s) 1710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1725. Volatile media include, without limitation, dynamic memory, such as the working memory 1735.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1700.

The communications subsystem 1730 (and/or components thereof) generally will receive signals, and the bus 1705 then might carry the signals (and/or the data, instructions, etc. carried by the signals) to the working memory 1735, from which the processor(s) 1710 retrieves and executes the instructions. The instructions received by the working memory 1735 may optionally be stored on a non-transitory storage device 825 either before or after execution by the processor(s) 1710.

Figure 18:
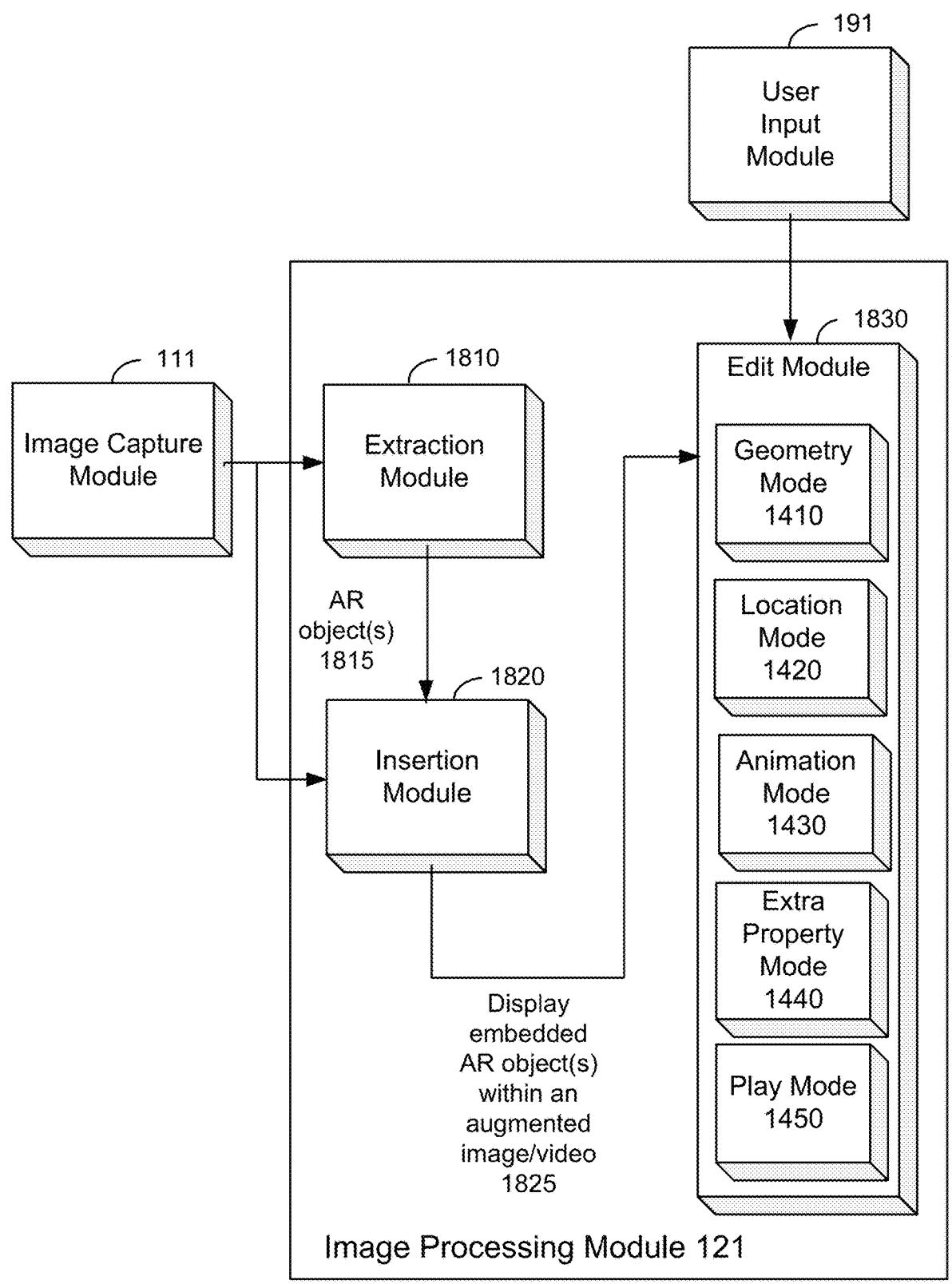
FIG. 18 illustrates an example of an image processing module with different software modules for executing the tasks associated with embodiments of the present invention.

FIG. 18 illustrates an example of image processing module 121 with different software modules for executing the tasks associated with embodiments of the present invention. In some arrangements, the instructions/code for carrying the tasks associated with the different software modules can be stored a the memory 181 of the mobile device.

Alternatively, the software modules described in FIG. 18 can be executed by the processor(s) 1710 of FIG. 17. In some arrangements, the instructions/code for carrying the tasks associated with the different software modules can be stored at the storage device(s) 1725.

According to some embodiments, the software modules can include an extraction module 1810, an insertion module 1820, and an edit module 1830.

In one or more arrangements, the extraction module 1810 can extract the portion of the target image corresponding to the one or more objects positioned against the background image. In some instances, the extraction can be based on comparing the background image with the target image to determine the portion of the target image corresponding to the one or more objects positioned against the background. For example, the portion of the target image can be based on a sketch drawn by a user or a 3-D physical object placed on the background. Additionally, the extraction module 1810 can generate AR object(s) 1815 based on the portion of the target image corresponding to the one or more objects. According to some embodiments, the received image data (e.g., target image) used by the extraction module 1810 can be received from the image capture module 111.

In one or more arrangements, the insertion module 1820 can be used by the real-time AR sketching application to display the AR object(s) on the display screen. For example, the display screen can be the display module 181 of the mobile device 100. Additionally, the insertion module 1820 can combine the received image data (e.g., target image) from the image capture module 111 and the generated AR object(s) to display embedded AR object(s) within an augmented image/video 1825.

In one or more arrangements, the edit module 1830 can edit the embedded AR object(s) displayed on the augmented image/video. In some instances, the edit module can receive user inputs from the user input module 191. As previously discussed, FIG. 14 describes examples of editing methods that the user can use to edit the AR object(s). As illustrated from the table in FIG. 14, the edit module 1830 can include a geometry mode 1410, a location mode 1420, an animation mode 1430, an extra property mode 1440, and a play mode 1450.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:
1. A method for generating one or more augmented reality (AR) objects by a mobile device, the method comprising:
capturing, by a camera of the mobile device based on instructions from an application executed on the mobile device, a digital image of one or more physical objects;
segmenting the digital image into one or more areas corresponding to the one or more physical objects and one or more areas corresponding to a background;
generating, from the digital image, one or more digital representations of the one or more physical objects in the digital image, the one or more digital representations of the one or more physical objects being generated using data from the digital image in the one or more areas corresponding to the one or more physical objects;
converting, by a processor of the mobile device based on instructions from the application, the one or more digital representations of the one or more physical objects in the digital image to one or more two-dimensional augmented reality (AR) objects, wherein converting the one or more digital representations of the one or more physical objects to the one or more two-dimensional AR objects causes the one or more digital representations to be editable versions of the one or more physical objects;
dividing a two-dimensional AR object of the one or more two-dimensional AR objects into a plurality of parts;
editing a geometry of the two-dimensional AR object based on a user input, the editing including at least one of adding a depth effect to at least one part of the two-dimensional AR object and manipulating a designated part of the plurality of parts based on the user input, the added depth effect causing the at least one part to appear to have more than two dimensions when displayed;
augmenting a target image using the one or more two-dimensional AR objects; and
displaying the augmented target image on the mobile device based on instructions from the application.

2. The method of claim 1, wherein segmenting the digital image further comprises subtracting the background from the digital image.

3. The method of claim 1, wherein an amount of the depth effect added to the at least one part of the two-dimensional AR object is based on a determined finger pressure on a display of the mobile device.

4. The method of claim 1, wherein one of the one or more physical objects comprises a two-dimensional sketch.

5. The method of claim 1, wherein one of the one or more physical objects comprises a three-dimensional object.

6. The method of claim 1, wherein at least one of the one or more physical objects is coplanar with the background.

7. The method of claim 1, wherein the background is a feature tracking target.

8. The method of claim 1, further comprising refining one of the one or more areas corresponding to the one or more physical objects.

9. The method of claim 1, wherein the one or more two-dimensional AR objects are generated based on detection of a two-dimensional blob within the captured digital image, the detection of the two-dimensional blob being based on a surface reflectance associated with the one or more physical objects positioned on the background.

10. The method of claim 1, wherein the background includes a horizontal tracking area and a vertical tracking area.

11. The method of claim 1, further comprising displaying, on a display of the mobile device, the one or more two-dimensional AR objects in real-time.

12. An apparatus for generating one or more Augmented Reality (AR) objects, comprising:
   memory;
   an image capturing module including an image sensor, the image capturing module configured to capture, based on instructions from an application executed on the apparatus, a digital image of one or more physical objects; and
   one or more processors coupled to the memory and the image capturing module, the one or more processors configured to:
      segment the digital image into one or more areas corresponding to the one or more physical objects and one or more areas corresponding to a background;
      generate, from the digital image, one or more digital representations of the one or more physical objects in the digital image, the one or more digital representations of the one or more physical objects being generated using data from the digital image in the one or more areas corresponding to the one or more physical objects;
      convert, based on instructions from the application, the one or more digital representations of the one or more physical objects in the digital image to one or more two-dimensional augmented reality (AR) objects, wherein converting the one or more digital representations of the one or more physical objects to the one or more two-dimensional AR objects causes the one or more digital representations to be editable versions of the one or more physical objects;
      divide a two-dimensional AR object of the one or more two-dimensional AR objects into a plurality of parts;
      edit a geometry of the two-dimensional AR object based on a user input, the editing including at least one of adding a depth effect to at least one part of the two-dimensional AR object and manipulating a designated part of the plurality of parts based on the user input, the added depth effect causing the at least one part to appear to have more than two dimensions when displayed;
      augment a target image using the one or more two-dimensional AR objects; and
      display the augmented target image on the apparatus based on instructions from the application.

13. The apparatus of claim 12, wherein segmenting the digital image further comprises subtracting the background from the digital image.

14. The apparatus of claim 12, wherein an amount of the depth effect added to the at least one part of the two-dimensional AR object is based on a determined finger pressure on a display.

15. The apparatus of claim 12, wherein one of the one or more physical objects comprises at least one or more of a two-dimensional sketch or a three-dimensional object.

16. The apparatus of claim 12, wherein at least one of the one or more physical objects is coplanar with the background.

17. The apparatus of claim 12, wherein the background is a feature tracking target.

18. The apparatus of claim 12, wherein the one or more processors are further configured to refine one of the one or more areas corresponding to the one or more physical objects.

19. The apparatus of claim 12, wherein the one or more two-dimensional AR objects are generated based on detection of a two-dimensional blob within the captured digital image, the detection of the two-dimensional blob being based on a surface reflectance associated with the one or more physical objects positioned on the background.

20. The apparatus of claim 12, wherein the background includes a horizontal tracking area and a vertical tracking area.

21. The apparatus of claim 12, further comprising a display device configured to display the one or more two-dimensional AR objects in real-time.

22. One or more non-transitory computer-readable media storing computer-executable instructions for generating one or more Augmented Reality (AR) objects that, when executed, cause one or more computing devices included in a mobile device to:
   capture, by a camera of the mobile device based on the computer-executable instructions being executed on the mobile device, a digital image of one or more physical objects;
   segment the digital image into one or more areas corresponding to the one or more physical objects and one or more areas corresponding to a background;
   generate, from the digital image, one or more digital representations of the one or more physical objects in the digital image, the one or more digital representations of the one or more physical objects being generated using data from the digital image in the one or more areas corresponding to the one or more physical objects; and
   convert, by the one or more computing devices based on the computer-executable instructions being executed on the mobile device, the one or more digital representations of the one or more physical objects in the digital image to one or more two-dimensional augmented reality (AR) objects, wherein converting the one or more digital representations of the one or more physical objects to the one or more two-dimensional AR objects causes the one or more digital representations to be editable versions of the one or more physical objects;

divide a two-dimensional AR object of the one or more two-dimensional AR objects into a plurality of parts;

edit a geometry of the two-dimensional AR object based on a user input, the editing including at least one of adding a depth effect to at least one part of the two-dimensional AR object and manipulating a designated part of the plurality of parts based on the user input, the added depth effect causing the at least one part to appear to have more than two dimensions when displayed;

augment a target image using the one or more two-dimensional AR objects; and display the augmented target image on the mobile device based on the computer-executable instructions being executed on the mobile device.

23. The method of claim 1, wherein the added depth effect causes the part to appear to have two and a half dimensions.

24. The method of claim 1, wherein the one or more AR objects are generated in real-time by the mobile device.

25. The method of claim 1, wherein the one or more AR objects are generated in real-time by the mobile device without using an electronic device other than the mobile device.

* * * * *